United States Patent
Nakamura et al.

(10) Patent No.: US 7,529,622 B2
(45) Date of Patent: May 5, 2009

(54) MOBILE APPARATUS, AND CONTROL METHOD THEREOF, CONTROL PROGRAM AND SUPERVISORY SYSTEM THEREFOR

(75) Inventors: Makoto Nakamura, Wako (JP);
Yasuhiro Sawada, Wako (JP);
Mitsuhide Kuroda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/958,928

(22) Filed: Dec. 18, 2007

(65) Prior Publication Data
US 2008/0154430 A1    Jun. 26, 2008

(30) Foreign Application Priority Data
Dec. 20, 2006 (JP) .............................. 2006-342638

(51) Int. Cl.
*B25J 5/00* (2006.01)
*G05D 1/02* (2006.01)

(52) U.S. Cl. .................... 701/301; 700/245; 700/30; 318/568.12; 701/26

(58) Field of Classification Search ................ 700/301, 700/89, 247, 255; 701/301, 28; 318/568.12, 318/568.19; 901/1, 49, 50
See application file for complete search history.

(56) References Cited

U.S. PATENT DOCUMENTS 5,056,031 A * 10/1991 Nakano et al. .............. 701/301
5,502,638 A * 3/1996 Takenaka ..................... 701/87
6,317,652 B1   11/2001 Osada
6,484,068 B1   11/2002 Yamamoto et al.
7,107,107 B2 * 9/2006 Morikawa et al. ............ 700/31

(Continued)

FOREIGN PATENT DOCUMENTS

EP             307091 A2 *  3/1989

(Continued)

OTHER PUBLICATIONS

James J. Kuffner, Jr., StevenM. LaVall, eRRt-Connect:An Efficient Approach to Single-Query Path Planning, Proc IEEE Int'l Conf on Robotics and Auctomation, (ICRA 2000), pp. 995-1001, vol. 2.*

(Continued)

*Primary Examiner*—Thomas G Black
*Assistant Examiner*—Lin B Olsen
(74) *Attorney, Agent, or Firm*—Rankin, Hill & Clark LLP

(57) ABSTRACT

A mobile apparatus for moving or acting while avoiding contact with an object, and reducing a change in the behavior of the object. It is determined whether there is a first spatial element that satisfies a contact condition that there is a possibility of contact with a reference spatial element on a discriminant plane including at least part of a representative point trajectory of a robot. If there is a first spatial element that satisfies the contact condition, a second action plan element involving changing the representative point trajectory is assumed, and it is determined whether there is a first spatial element that satisfies the contact condition on a new discriminant plane including at least part of the changed representative point trajectory. If there is no first spatial element that satisfies the contact condition on the new discriminant plane, the assumed new "second action plan element" is set.

19 Claims, 16 Drawing Sheets

U.S. PATENT DOCUMENTS

| | | | |
|---|---|---|---|
| 7,353,149 B2 * | 4/2008 | Strunk et al. | 703/7 |
| 7,447,593 B2 * | 11/2008 | Estkowski et al. | 701/301 |
| 2006/0025888 A1 | 2/2006 | Gutmann et al. | |
| 2006/0217838 A1 * | 9/2006 | Sugino et al. | 700/245 |
| 2007/0078918 A1 * | 4/2007 | Nagasaka et al. | 708/200 |
| 2008/0154391 A1 * | 6/2008 | Nakamura et al. | 700/30 |
| 2008/0269973 A1 * | 10/2008 | Kuroda | 701/26 |

FOREIGN PATENT DOCUMENTS

| | | |
|---|---|---|
| JP | 62-34784 | 2/1987 |
| JP | 03-050679 | 3/1991 |
| JP | 03-116205 | 5/1991 |
| JP | 04-358209 | 12/1992 |
| JP | 05-250023 | 9/1993 |
| JP | 06-138941 | 5/1994 |
| JP | 07-248820 | 9/1995 |
| JP | 2000-339029 | 12/2000 |
| JP | 2004-306247 | 11/2004 |
| JP | 2006-239844 | 9/2006 |
| WO | 03/090978 | 11/2003 |
| WO | 03/090979 | 11/2003 |

OTHER PUBLICATIONS

"Planning and navigation by a mobile robot in the presence of multiple moving obstacles and their velocities", Takashi Tsubouchi et al., vol. 12, No. 7, pp. 1029-1037, English abstract included.

"Visual robot navigation using flat earth obstacle projection", Bidlack C. et al, Robotics and Automation, 1994, Proceedings., 1994 IEEE International Conference on San Diego, CA, USA May 8-13, 1994, Los Alamitos, CA, USA, IEEE Comput. Soc, May 8, 1994, pp. 3374-3381, XP010097532.

"Recursive agent modeling with probabilistic velocity obstacles for mobile robot navigation among humans", Boris Kluge, Proceedings of the 2003 IEEE/RSJ International Conference on Intelligent Robots and Systems. (IROS 2003). Las Vegas, NV, Oct. 27-31, 2003; (IEEE/RSJ International Conference on Intelligent Robots and Systems), New York, NY: IEEE, US., vol. 1, Oct. 27, 2003, pp. 376-381, XP010672386.

* cited by examiner

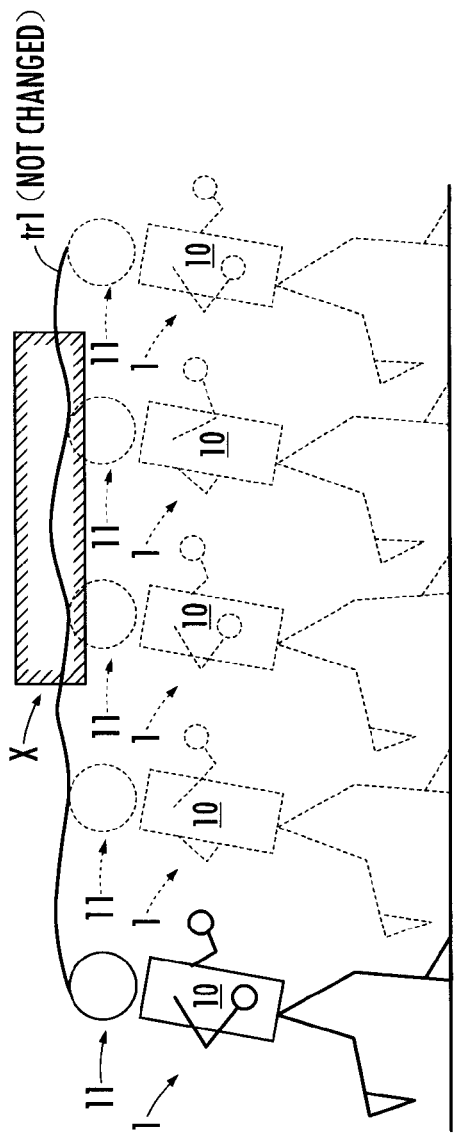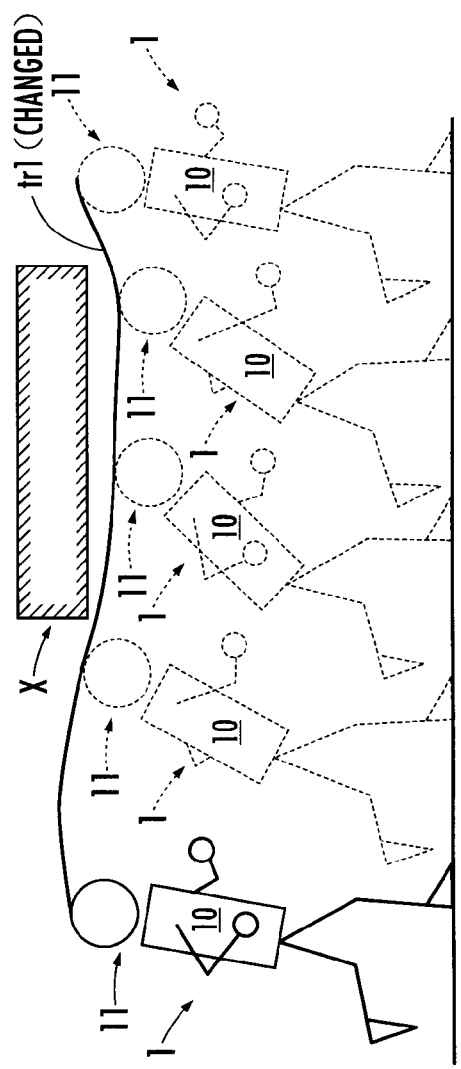

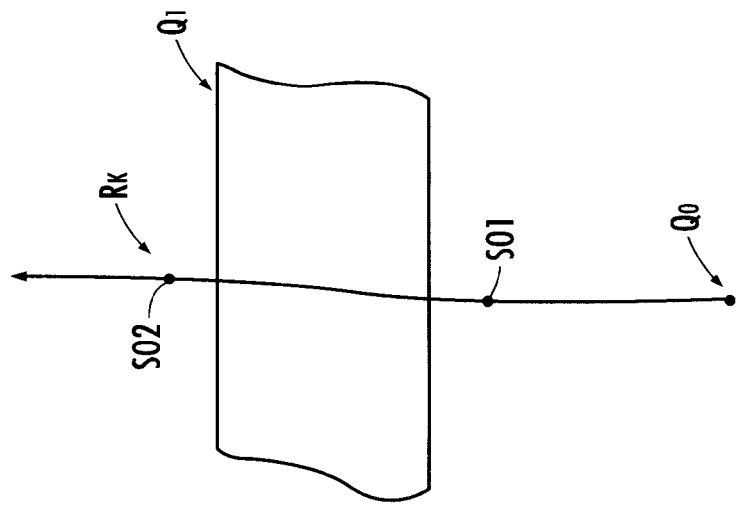
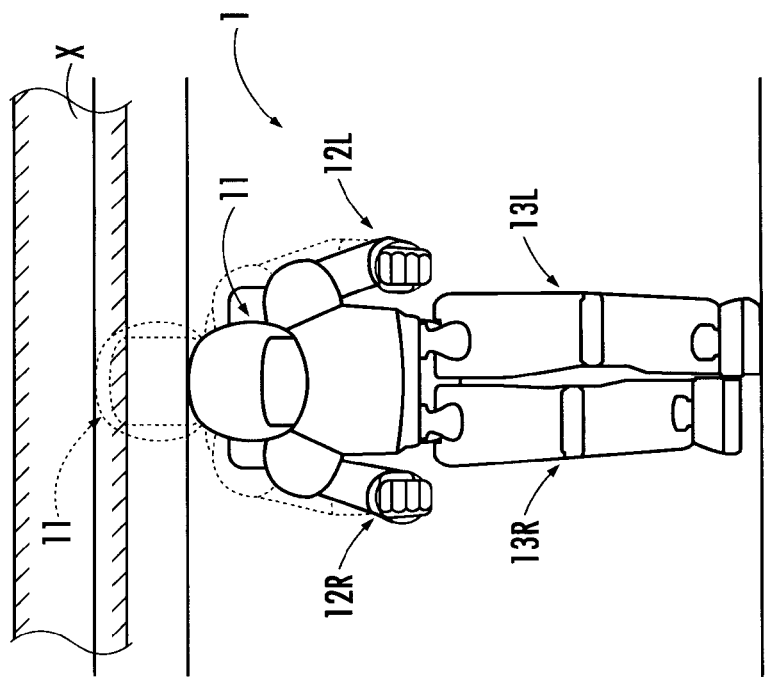

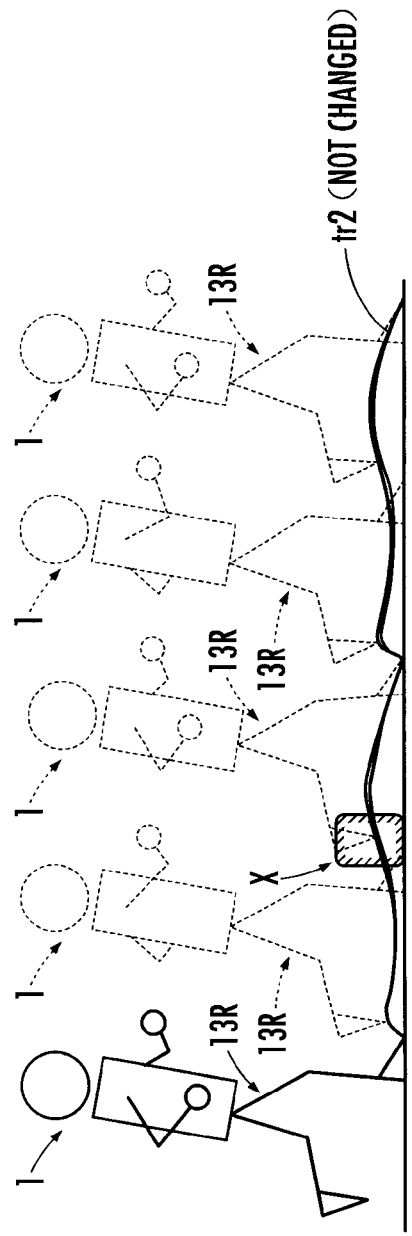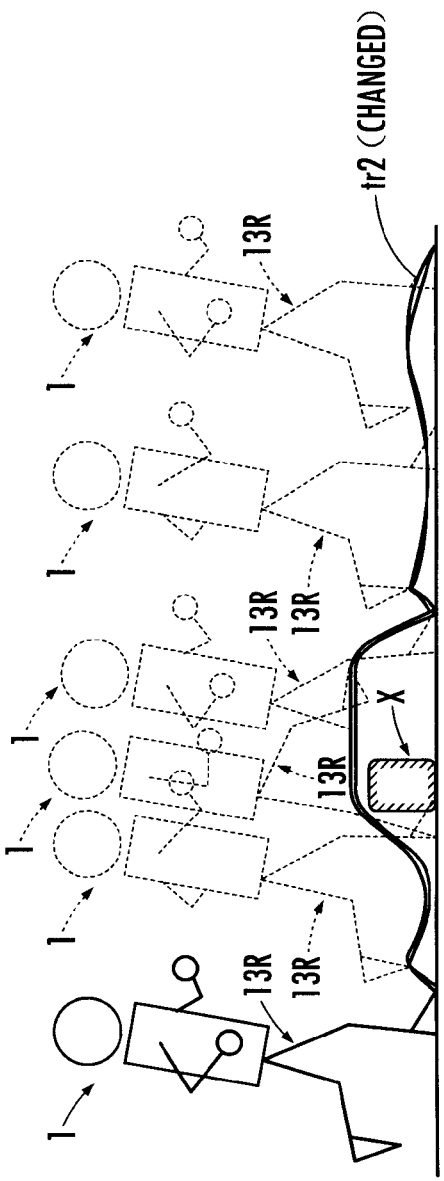

P₂ (BEFORE POSTURE CHANGE)

P₂ (AFTER POSTURE CHANGE)

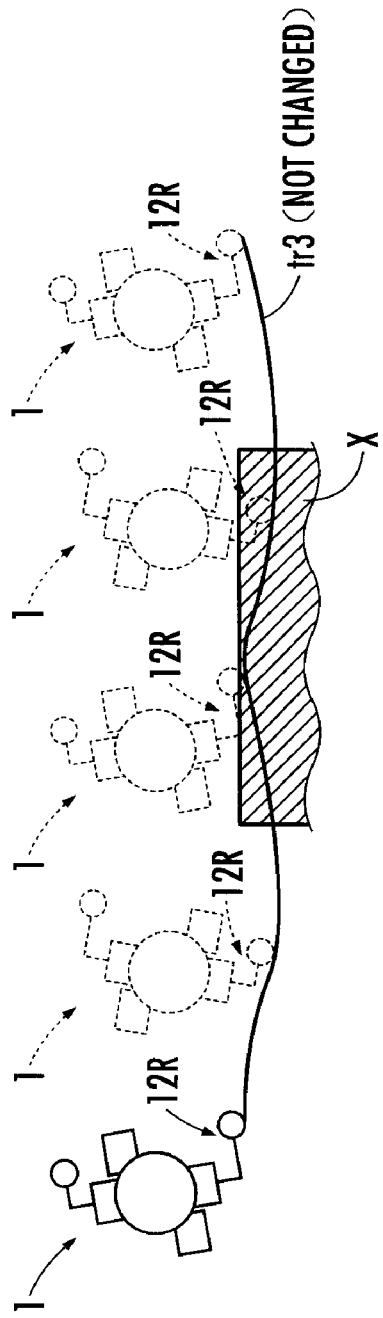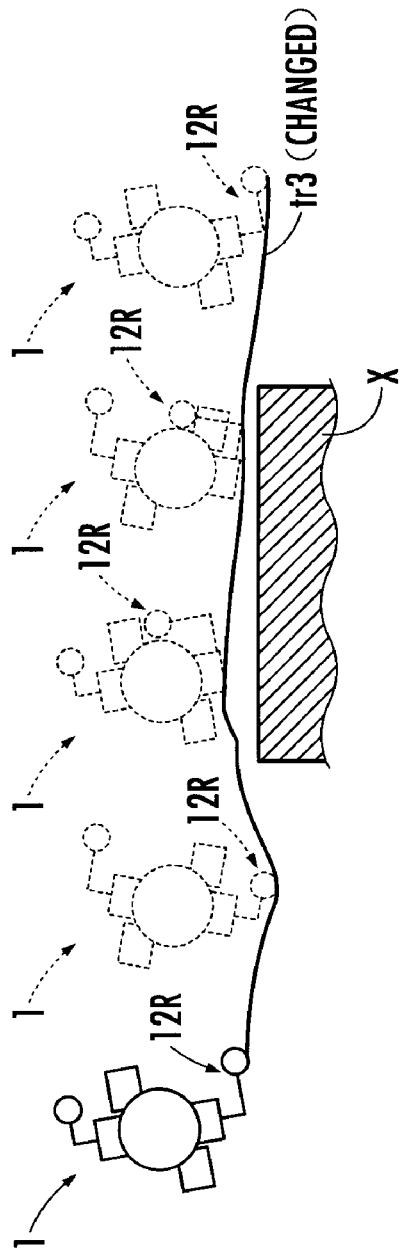

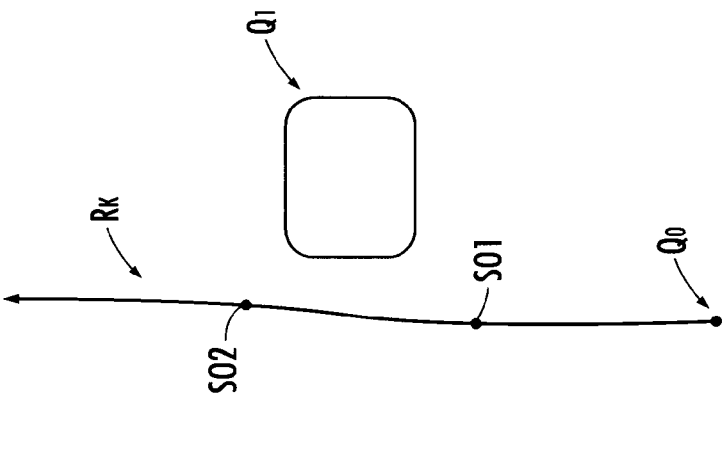
FIG.15 (c) P₃ (AFTER POSTURE CHANGE)
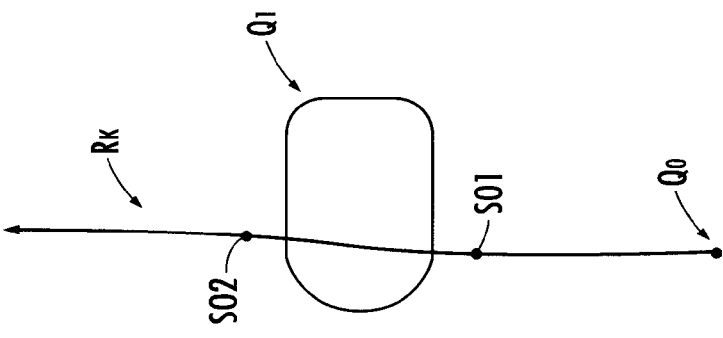
FIG.15 (b) P₃ (BEFORE POSTURE CHANGE)
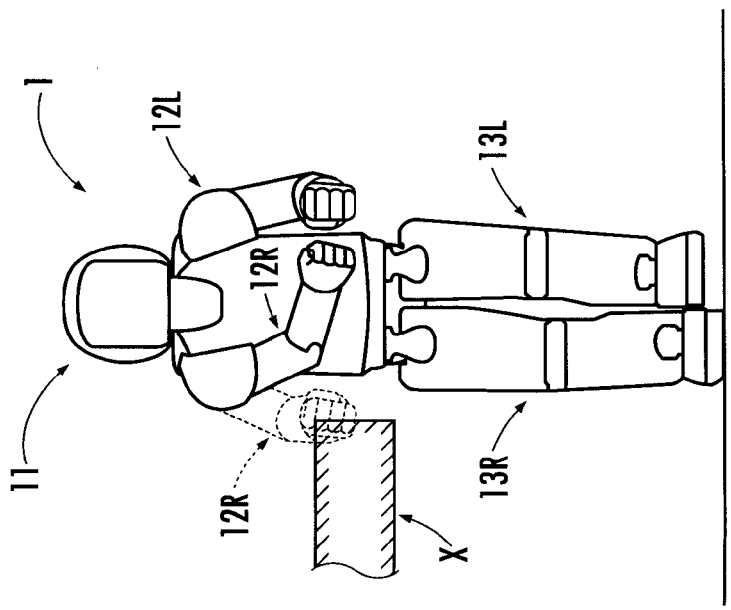
FIG.15 (a)

MOBILE APPARATUS, AND CONTROL METHOD THEREOF, CONTROL PROGRAM AND SUPERVISORY SYSTEM THEREFOR

BACKGROUND OF THE INVENTION

1. Field of the Invention

The present invention relates to an apparatus capable of autonomously moving according to a movement plan, for example.

2. Description of the Related Art

As the functionality of robots is enhanced, robots have had more opportunities to carry a burden or induce a person to a destination, for example, and thus, there is an increasing demand for a technique that allows robots to move by avoiding contact with people around them. There has been proposed a technique that allows a robot to move by avoiding contact with a plurality of objects (obstacles) around it by taking into account the movement velocities of the objects (see "Planning and navigation by a mobile robot in the presence of multiple moving obstacles and their velocities", Journal of the Robotics Society of Japan, Vol. 12, No. 7, pp. 1029-1037, 1994). According to this technique, in order to plan an optimum path for reaching a destination while avoiding contact between a robot and objects, prediction of the movement of each object and planning of a path that involves no contact between the robot and the objects based on the prediction are repeated in short cycles.

SUMMARY OF THE INVENTION

However, if a robot immediately changes the behavior in response to a change in the behavior of a person around it, such as a change of the movement velocity (including the direction) of the person, the change in the behavior of the robot can induce a change in the behavior of the person or another person, thereby increasing the possibility of contact between the robot and the people. For example, if the robot immediately moves to the left in response to a person facing the robot moving toward the right of the robot, the person or another person can change the movement direction in response to this to thereby increase the possibility of contact between them. In this case, it is difficult for the robot and the people around it to move in harmony.

Thus, an object of the present invention is to provide a mobile apparatus or the like that is capable of moving or acting by avoiding contact with an object, such as a person, while suppressing the possibility that the movement or action of the mobile apparatus induces a change in the behavior of the object.

According to a first aspect of the present invention, there is provided a mobile apparatus that has a control system, moves according to a first action plan element under the control of the control system, and adjusts a posture according to a second action plan element, in which said control system comprises a first processing section which recognizes a current image of said mobile apparatus, a current image of an object, and an intermittent or continuous future image of the object, which is determined according to the behavior of the object and has a larger size than the current image thereof, as a reference spatial element, a first spatial element and a second spatial element having a larger size than the first spatial element, respectively, on a discriminant plane including at least a part of a representative point trajectory of said mobile apparatus determined based on said second action plan element. The control system further comprises a second processing section which determines, based on the result of the recognition by the first processing section, whether or not there is a first spatial element that satisfies a contact condition that there is a possibility of contact with the reference spatial element on the discriminant plane. The control system also comprises a third processing section which assumes a second action plan element involving changing the representative point trajectory and makes the first processing section recognize the reference spatial element, the first spatial element and the second spatial element on a new discriminant plane including at least a part of the changed representative point trajectory and determine whether or not there is a first spatial element that satisfies the contact condition on the new discriminant plane under the assumption when the second processing section determines that there is a first spatial element that satisfies the contact condition on the discriminant plane, and sets a route that allows the reference spatial element to avoid contact with the second spatial element as the first action plan element on the discriminant plane including at least a part of the representative point trajectory not changed based on the result of the recognition by the first processing section when the second processing section determines that there is still a first spatial element that satisfies the contact condition on the new discriminant plane, and sets the assumed second action plan element as a new second action plan element when the second processing section determines that there is no first spatial element that satisfies the contact condition on the new discriminant plane.

The mobile apparatus according to the first aspect of the present invention recognizes a current image of the mobile apparatus, a current image of an object, and an intermittent or continuous future image of the object, which is determined according to the behavior of the object, as a "reference spatial element", a "first spatial element" and a "second spatial element" on a discriminant plane, respectively. Since the intermittent or continuous future image of the object has a larger size than the current image of the object, the second spatial element is recognized on the discriminant plane as a spatial element having a larger size than the first spatial element. In other words, the first spatial element is recognized on the discriminant plane as a spatial element having a smaller size than the second spatial element. Here, the "discriminant plane" is a flat surface or a curved surface defined to two-dimensionally recognize the position, the shape and the size of the mobile apparatus or the like in the real space. "A discriminant plane" means "one discriminant plane" or "each discriminant plane of a group of discriminant planes". The discriminant plane includes at least part of the representative point trajectory of the mobile apparatus determined based on the "second action plan element". A "spatial element" on the discriminant plane is defined as a point, a segment, a region, a closed curve (a contour or a region) or the like on the discriminant plane. If an object is attached to the mobile apparatus and moves together with the mobile apparatus, for example, the mobile apparatus and the object are collectively recognized as the first spatial element on each discriminant plane.

Then, it is determined whether or not there is a first spatial element that satisfies the "contact condition" that there is a possibility of contact with the reference spatial element on the discriminant plane. If it is determined that there is a first spatial element that satisfies the contact condition, a second action plan element that involves changing the representative point trajectory is assumed. The reference spatial element, the first spatial element and the second spatial element are recognized again on a new discriminant plane including at least part of the representative point trajectory changed under the assumption. Furthermore, it is determined whether or not there is a first spatial element that satisfies the contact condition on the new discriminant plane.

If it is determined that there is still a first spatial element that satisfies the contact condition on the new discriminant plane, a route that allows the reference spatial element to avoid contact with the second spatial element on the discriminant plane including at least part of the representative point trajectory not changed is set as the "first action plan element". Thus, in a situation where the mobile apparatus cannot avoid contact with the object by changing the posture, the route, which is the first action plan element, is changed. By following the route, which is the first action plan element, the mobile apparatus can continue to move while avoiding contact with the object.

On the other hand, if it is determined that there is no first spatial element that satisfies the contact condition on the new discriminant plane, the assumed new "second action plan element" is set. By changing the posture based on the second action plan element, the mobile apparatus can continue to move while avoiding contact with the object without changing the route, which is the first action plan element.

The frequency of changes of the route, which is the first action plan element, is reduced not only because the posture of the mobile apparatus can be changed to avoid contact with the object but also for the reason described below. That is, it is a requirement for changing the route that at least one of first spatial elements having relatively smaller sizes on the discriminant plane satisfies the contact condition. As a result, compared with a case where it is determined whether or not a spatial element having a larger size than the first spatial element, such as the second spatial element, satisfies the contact condition, the frequency of changes of the route, which is the first action plan element and, therefore, the frequency of changes in the movement direction or the like of the mobile apparatus are reduced. Therefore, the possibility that a change in the behavior of the mobile apparatus induces a change in the behavior of the object can also be reduced.

In particular, if each spatial element is recognized on each of a plurality of discriminant planes, and it is a requirement for changing the first action plan element that there is a first spatial element that satisfies the contact condition on any of the plurality of discriminant planes, the route can be changed at an appropriate frequency taking into account the three-dimensional shape and size of the mobile apparatus and the object. In general, the mobile apparatus and the object each have contour characteristics in which the shape and the size thereof vary with the position, such as the height from the floor surface. Thus, the shapes and the sizes of the mobile apparatus and the object at different positions can be reflected in the shape and the size (including the relative size of one spatial element with respect to the other spatial element) of the reference spatial element and the first spatial element recognized on the respective discriminant planes. Therefore, to prevent the mobile apparatus recognized as the reference spatial element from coming into contact with the object recognized as the first spatial element, the route as the first action plan element can be changed at an appropriate frequency taking into account the three-dimensional contour characteristics and the behavior, such as the position and the velocity, of the mobile apparatus and the object.

Furthermore, a route appropriate for preventing the mobile apparatus from coming into contact with the object with reliability is set for the reason described below. When setting a new route, a route that allows the reference spatial element to avoid contact with the second spatial element having a relatively large size on the discriminant plane is set as the new route. Therefore, compared with a case where the new route is set with reference to a spatial element having a smaller size than the second spatial element, such as the first spatial element, a route that allows the mobile apparatus to avoid contact with the object with reliability is set.

In particular, if each spatial element is recognized on each of a plurality of discriminant planes, and a route that allows the reference spatial element to avoid contact with the second spatial element on all of the plurality of discriminant planes is set as the first action plan element, a route appropriate for preventing the mobile apparatus and the object from coming into contact with each other can be set by taking into account the three-dimensional shapes and the sizes thereof.

In this specification, the expression that a constituent spatial element "recognizes" information means that the constituent spatial element performs any processing for preparing information for a required information processing, such as reading information from a storage device, such as a memory, retrieving information from a database, receiving information using a communication feature, performing measurement, estimation, calculation, setting, prediction or the like of required information from basic information retrieved or otherwise obtained, and storing information measured or otherwise obtained in a memory.

According to a second aspect of the present invention, in the mobile apparatus according to the first aspect of the present invention, said first processing section recognizes said reference spatial element, said first spatial element and said second spatial element on a first discriminant plane, which is a discriminant plane including at least a part of an upper end trajectory of a first part of said mobile apparatus, which is a representative point trajectory, said second processing section determines whether or not there is a first spatial element that satisfies the contact condition on the first discriminant plane based on the result of the recognition by the first processing section, and said third processing section assumes lowering of the upper end trajectory of the first part as the second action plan element when the second processing section determines that there is a first spatial element that satisfies the contact condition on the first discriminant plane.

According to a third aspect of the present invention, the mobile apparatus according to the second aspect of the present invention has, as said first part, a head on top of a base body capable of being inclined with respect to the vertical direction, and said third processing section sets, as the second action plan element, lowering of the upper end trajectory of the head by increasing the angle of inclination of the base body with respect to the vertical direction when the second processing section determines that there is a first spatial element that satisfies the contact condition on the first discriminant plane.

According to a fourth aspect of the present invention, the mobile apparatus according to the second aspect of the present invention has an arm extending from a base body as the first part, and said third processing section sets, as the second action plan element, lowering of the upper end trajectory of the arm by changing the posture of the arm when the second processing section determines that there is a first spatial element that satisfies the contact condition on the first discriminant plane.

According to the second to fourth aspects of the present invention, in the case where there is a possibility that the first part of the mobile apparatus comes into contact with an object, it is determined whether or not the mobile apparatus can avoid contact with the object by lowering the upper end trajectory of the first part (which may be a head (according to the third aspect) or an arm (according to the fourth aspect)). Specifically, when it is determined that there is a first spatial element that satisfies the contact condition on the discriminant plane including at least part of the upper end trajectory of the first part, a change of the second action plan element involving lowering of the upper end trajectory of the first part is assumed, and it is determined whether or not the contact condition is satisfied on the discriminant plane including at least part of the changed upper end trajectory of the first part.

If the result of the determination is negative, the route, which is the first action plan element, is changed as described above, and the second action plan element is not changed. The mobile apparatus can move to the target position while avoiding contact with the object by following the changed route, which is the first action plan element.

On the other hand, if the result of the determination is positive, the route, which is the first action plan element, is not changed, and the second action plan element is changed based on the assumption. The mobile apparatus can move to the target position while avoiding contact with the object by changing the posture according to the second action plan element while following the route, which is the first action plan element. Thus, the frequency of changes in the movement direction of the mobile apparatus can be reduced, and the possibility that a change in the movement direction of the mobile apparatus induces an unexpected change in the behavior of the object can be reduced.

According to a fifth aspect of the present invention, in the mobile apparatus according to the first aspect of the present invention, said first processing section recognizes said reference spatial element, said first spatial element and said second spatial element on a second discriminant plane, which is a discriminant plane including at least a part of a lower end trajectory of a second part of said mobile apparatus, which is a representative point trajectory, said second processing section determines whether or not there is a first spatial element that satisfies the contact condition on the second discriminant plane based on the result of the recognition by the first processing section, and said third processing section assumes raising of the lower end trajectory of the second part as the second action plan element when the second processing section determines that there is a first spatial element that satisfies the contact condition on the second discriminant plane.

According to a sixth aspect of the present invention, the mobile apparatus according to the fifth aspect of the present invention has, as said second part, a plurality of legs that extend from a base body and are repeatedly lifted up from and put down on a floor, and said third processing section sets, as the second action plan element, raising of the lower end trajectory of a leg of the plurality of legs that is lifted up from the floor when the second processing section determines that there is a first spatial element that satisfies the contact condition on the second discriminant plane.

According to a seventh aspect of the present invention, the mobile apparatus according to the fifth aspect of the present invention has an arm extending from a base body as the second part, and said third processing section sets, as the second action plan element, raising of the lower end trajectory of the arm by changing the posture of the arm when the second processing section determines that there is a first spatial element that satisfies the contact condition on the second discriminant plane.

According to the fifth to seventh aspects of the present invention, in the case where there is a possibility that the second part (which may be a plurality of legs (according to the sixth aspect) or an arm (according to the seventh aspect)) of the mobile apparatus comes into contact with an object, it is determined whether or not the mobile apparatus can avoid contact with the object by raising the lower end trajectory of the second part. Specifically, when it is determined that there is a first spatial element that satisfies the contact condition on the discriminant plane including at least part of the lower end trajectory of the second part, a change of the second action plan element involving raising of the lower end trajectory of the second part is assumed, and it is determined whether or not the contact condition is satisfied on the discriminant plane including at least part of the changed lower end trajectory of the second part.

If the result of the determination is negative, the route, which is the first action plan element, is changed as described above, and the second action plan element is not changed. The mobile apparatus can move to the target position while avoiding contact with the object by following the changed route, which is the first action plan element.

On the other hand, if the result of the determination is positive, the route, which is the first action plan element, is not changed, and the second action plan element is changed based on the assumption. The mobile apparatus can move to the target position while avoiding contact with the object by changing the posture according to the second action plan element while following the route, which is the first action plan element. Thus, the frequency of changes in the movement direction of the mobile apparatus can be reduced, and the possibility that a change in the movement direction of the mobile apparatus induces an unexpected change in the behavior of the object can be reduced.

According to an eighth aspect of the present invention, in the mobile apparatus according to the first aspect of the present invention, said first processing section recognizes said reference spatial element, said first spatial element and said second spatial element on a third discriminant plane, which is a discriminant plane including at least a part of a left or right end trajectory of a third part of said mobile apparatus, which is a representative point trajectory, said second processing section determines whether or not there is a first spatial element that satisfies the contact condition on the third discriminant plane based on the result of the recognition by the first processing section, and said third processing section assumes rightward or leftward shift of the left or right end trajectory of the third part as the second action plan element when the second processing section determines that there is the first spatial element that satisfies the contact condition on the third discriminant plane.

According to a ninth aspect of the present invention, the mobile apparatus according to the eighth aspect of the present invention has an arm extending from a base body as said third part, and said third processing section sets, as the second action plan element, rightward or leftward shift of the left or right end trajectory of the arm by changing the posture of the arm when the second processing section determines that there is a first spatial element that satisfies the contact condition on the third discriminant plane.

According to a tenth aspect of the present invention, the mobile apparatus according to the eighth aspect of the present invention has, as said third part, a plurality of legs that extend from a base body and are repeatedly lifted up from and put down on a floor, and said third processing section sets, as the second action plan element, rightward or leftward shift of the left or right end trajectory of the plurality of legs when the second processing section determines that there is a first spatial element that satisfies the contact condition on the third discriminant plane.

According to the eighth to tenth aspects of the present invention, in the case where there is a possibility that the third part (which may be an arm (according to the ninth aspect) or a plurality of legs (according to the tenth aspect)) of the mobile apparatus comes into contact with an object, it is determined whether or not the mobile apparatus can avoid contact with the object by shifting rightward or leftward the left or right end trajectory of the third part. Specifically, when it is determined that there is a first spatial element that satisfies the contact condition on the third discriminant plane including at least part of the left or right end trajectory of the third part, a change of the second action plan element involving rightward or leftward shift of the left or right end trajectory of the third part is assumed, and it is determined whether or not the contact condition is satisfied on the third discriminant plane including at least part of the changed left or right end trajectory of the third part.

If the result of the determination is negative, the route, which is the first action plan element, is changed as described above. The mobile apparatus can move to the target position while avoiding contact with the object by following the changed route, which is the first action plan element.

On the other hand, if the result of the determination is positive, the route, which is the first action plan element, is not changed, and the second action plan element is changed based on the assumption. The mobile apparatus can move to the target position while avoiding contact with the object by changing the posture according to the second action plan element while following the route, which is the first action plan element. Thus, the frequency of changes in the movement direction of the mobile apparatus can be reduced, and the possibility that a change in the movement direction of the mobile apparatus induces an unexpected change in the behavior of the object can be reduced.

According to an eleventh aspect of the present invention, in the mobile apparatus according to any one of the first to tenth aspects of the present invention, the first processing section recognizes the behavior of the object by some or all of the position, the velocity and the acceleration of the first spatial element on the discriminant plane and recognizes the first spatial element intermittently or continuously extended according to the result of the recognition so that the first spatial element does not include the reference spatial element as the second spatial element.

According to the eleventh aspect of the present invention, the size of the second spatial element on the discriminant plane is determined according to at least one of the position, the velocity and the acceleration of the first spatial element on the discriminant plane determined according to the behavior of the object. Therefore, the mobile apparatus can move or act so that the mobile apparatus does not come into contact with a superimposed future image of the object predicted based on the position or the like of the object.

According to a twelfth aspect of the present invention, in the mobile apparatus according to the eleventh aspect of the present invention, the first processing section recognizes the behavior of the object by the velocity of the first spatial element and the relative position and the relative velocity of the first spatial element with respect to the reference spatial element on the discriminant plane and recognizes the first spatial element intermittently or continuously extended according to the result of the recognition as the second spatial element.

According to the twelfth aspect of the present invention, the size of the second spatial element on the discriminant plane is determined according to the velocity of the first spatial element and the relative position and the relative velocity of the first spatial element with respect to the reference spatial element on the discriminant plane determined according to the behavior of the object. Therefore, the mobile apparatus can move or act so that the mobile apparatus does not come into contact with a superimposed future image of the object predicted based on the velocity of the object, and the relative position and the relative velocity of the object with respect to the mobile apparatus.

According to a thirteenth aspect of the present invention, in the mobile apparatus according to the first aspect of the present invention, the first processing section recognizes a region determined according to the contour characteristics of the object extended according to the contour characteristics of the mobile apparatus as the first spatial element on the discriminant plane.

According to the thirteenth aspect of the present invention, the contour characteristics of the mobile apparatus and the object can be collectively reflected in the contour characteristics of the first spatial element on the discriminant plane. Therefore, the precision of the determination of whether there is a possibility of contact between the reference spatial element and a first spatial element can be improved or maintained while simplifying the handling of the reference spatial element on the discriminant plane and therefore the determination process, for example.

According to a fourteenth aspect of the present invention, in the mobile apparatus according to the thirteenth aspect of the present invention, the first processing section recognizes a Minkowski sum of two regions determined according to the contour characteristics of the mobile apparatus and the object as the first spatial element on the discriminant plane.

According to the fourteenth aspect of the present invention, the contour characteristics of the mobile apparatus and the object can be collectively reflected in the contour characteristics of the first spatial element, which is a Minkowski sum, on the discriminant plane. Therefore, the precision of the determination of whether there is a possibility of contact between the reference spatial element and a first spatial element can be improved or maintained while simplifying the handling of the reference spatial element as a dot or a small region on the discriminant plane and therefore the determination process, for example.

According to a fifteenth aspect of the present invention, in the mobile apparatus according to the first aspect of the present invention, the second processing section determines, based on the result of the recognition by the first processing section, whether or not there is a first spatial element that satisfies a first contact condition, as the contact condition, concerning a movement cost of the reference spatial element on the discriminant plane.

According to the fifteenth aspect of the present invention, only when it is determined that there is a first spatial element that satisfies the second contact condition concerning the movement cost of the reference spatial element, it is determined that there is a possibility of contact between the reference spatial element and a first spatial element. The "movement cost" is evaluated to be higher as the time required for the movement is longer, or the distance from the mobile apparatus is longer, for example. As described above, when it is determined that there is a first spatial element that can come into contact with the reference spatial element, the first action plan element is changed. Therefore, the mobile apparatus can move by avoiding contact with the object while reducing the frequency of change in the behavior of the mobile apparatus that induces a change in the behavior of the object, such as a person. For a first spatial element corresponding to an object for which the movement cost of the mobile apparatus is high, and the possibility of contact with the mobile apparatus is currently low, the processing of changing the action plan element or the like based on the result of determination of the possibility of contact between the first spatial element and the reference spatial element is omitted, and the information processing load is reduced accordingly.

According to a sixteenth aspect of the present invention, in the mobile apparatus according to the fifteenth aspect of the present invention, the second processing section determines whether or not there is a first spatial element that satisfies the first contact condition that the movement cost falls within a prescribed range or is at a predetermined rank or lower.

According to the sixteenth aspect of the present invention, only when the movement cost of the mobile apparatus to the object is low, and it is determined that the two can come into contact with each other, action plan elements can be changed in order to avoid contact between the mobile apparatus and the object. Therefore, the mobile apparatus can move by avoiding contact with the object while reducing the frequency of change in the behavior of the mobile apparatus that induces a change in the behavior of the object, such as a person.

According to a seventeenth aspect of the present invention, in the mobile apparatus according to the sixteenth aspect of the present invention, the second processing section determines whether or not there is the first spatial element that satisfies the first contact condition that the movement cost falls within the prescribed range having a positive lower limit.

According to the seventeenth aspect of the present invention, the action plan element is not changed when the object is located near the mobile apparatus, and therefore, a change in the behavior of the mobile apparatus can induce an unexpected change in the behavior of the object to thereby increase the possibility of contact therebetween.

According to an eighteenth aspect of the present invention, in the mobile apparatus according to the first aspect of the present invention, the second processing section determines whether or not there is a first spatial element that satisfies a second contact condition, as the contact condition, concerning the positional relationship between the first spatial element and the route as the first action plan element.

According to the eighteenth aspect of the present invention, only when there is a first spatial element that satisfies the "second contact condition" concerning the positional relationship between the reference spatial element and the route, it can be determined that there is a possibility of contact between the reference spatial element and the first spatial element. As described above, when it is determined that there is a first spatial element that can come into contact, the first action plan element is changed. Therefore, the mobile apparatus can move by avoiding contact with the object while reducing the frequency of change in the behavior of the mobile apparatus that induces a change in the behavior of the object, such as a person. In addition, when it is determined, from the positional relationship between the route of the reference spatial element and the first spatial element, that there is no possibility of contact between the mobile apparatus and all the objects around the mobile apparatus, the processing of changing the action plan element based on the result of determination of the possibility of contact between the reference spatial element and the first spatial element is omitted, and the information processing load is reduced accordingly.

According to a nineteenth aspect of the present invention, in the mobile apparatus according to the eighteenth aspect of the present invention, the second processing section determines whether or not there is a first spatial element that satisfies the second contact condition that there is an intersection or contact between the first spatial element and the reference spatial element moving along the route as the first action plan element.

According to the nineteenth aspect of the present invention, only when it is determined that, if the mobile apparatus moves along the route as the first action plan element, and the possibility of contact with the object is high, the action plan element can be changed to avoid contact with the object. Therefore, the mobile apparatus can move by avoiding contact with the object while reducing the frequency of change in the behavior of the mobile apparatus that induces a change in the behavior of the object, such as a person.

According to a twentieth aspect of the present invention, there is provided a method of controlling the operation of a mobile apparatus that moves according to a first action plan element and adjusts the posture according to a second action plan element, the method comprising: first processing of recognizing a current image of said mobile apparatus, a current image of an object, and an intermittent or continuous future image of the object, which is determined according to the behavior of the object and has a larger size than the current image thereof, as a reference spatial element, a first spatial element and a second spatial element having a larger size than the first spatial element, respectively, on a discriminant plane including at least a part of a representative point trajectory of said mobile apparatus determined based on said second action plan element. The method further comprising a second processing of determining, based on a result of the recognition in the first processing, whether or not there is a first spatial element that satisfies a contact condition that there is a possibility of contact with the reference spatial element on the discriminant plane. The method also comprising a third processing of assuming a second action plan element involving changing the representative point trajectory and making the first processing recognize the reference spatial element, the first spatial element and the second spatial element on a new discriminant plane including at least a part of the changed representative point trajectory and determine whether or not there is the first spatial element that satisfies the contact condition on the new discriminant plane under the assumption when the second processing determines that there is a first spatial element that satisfies the contact condition on the discriminant plane, and setting a route that allows the reference spatial element to avoid contact with the second spatial element as the first action plan element on the discriminant plane including at least a part of the representative point trajectory not changed based on the result of the recognition in the first processing when the second processing determines that there is still a first spatial element that satisfies the contact condition on the new discriminant plane, and setting the assumed second action plan element as a new second action plan element when the second processing determines that there is no first spatial element that satisfies the contact condition on the new discriminant plane.

According to the twentieth aspect of the present invention, operation of the mobile apparatus can be controlled so that the mobile apparatus moves while avoiding contact with an object while reducing the frequency of changes of the route and, therefore, the frequency of inducing a change in the behavior of an object, such as a person, by changing the posture or the like thereof.

According to a twenty-first aspect of the present invention, there is provided a control program that makes a computer installed in the mobile apparatus according to the first aspect of the present invention function as the control system.

According to the twenty-first aspect of the present invention, the computer installed in the mobile apparatus can be made to function as a system for controlling the mobile apparatus so that the mobile apparatus moves by avoiding contact with an object while reducing the frequency of changes of the route and, therefore, the frequency of inducing a change in the behavior of an object, such as a person, by changing the posture or the like thereof.

According to a twenty-second aspect of the present invention, there is provided a supervisory system that distributes or broadcasts at least a part of the program according to the twenty-first aspect of the present invention to the computer installed in the mobile apparatus.

According to the twenty-second aspect of the present invention, a mobile apparatus capable of moving by avoiding contact with an object while reducing the frequency of changes of the route and, therefore, the frequency of inducing a change in the behavior of an object, such as a person, by changing the posture or the like thereof can be provided at any point in time by distributing a program to a computer installed in the mobile apparatus, for example.

BRIEF DESCRIPTION OF THE DRAWINGS

FIGS. 10(a)-10(b) are diagrams for illustrating functions of the mobile apparatus according to the present invention;

FIGS. 11(a)-11(c) are diagrams for illustrating functions of the mobile apparatus according to the present invention;

FIGS. 12(a)-12(b) are diagrams for illustrating functions of the mobile apparatus according to the present invention;

FIGS. 14(a)-14(b) are diagrams for illustrating functions of the mobile apparatus according to the present invention;

FIGS. 15(a)-15(c) are diagrams for illustrating functions of the mobile apparatus according to the present invention.

DETAILED DESCRIPTION OF THE PREFERRED EMBODIMENTS

A mobile apparatus or the like according to an embodiment of the present invention will be described with reference to the drawings.

Figure 1:
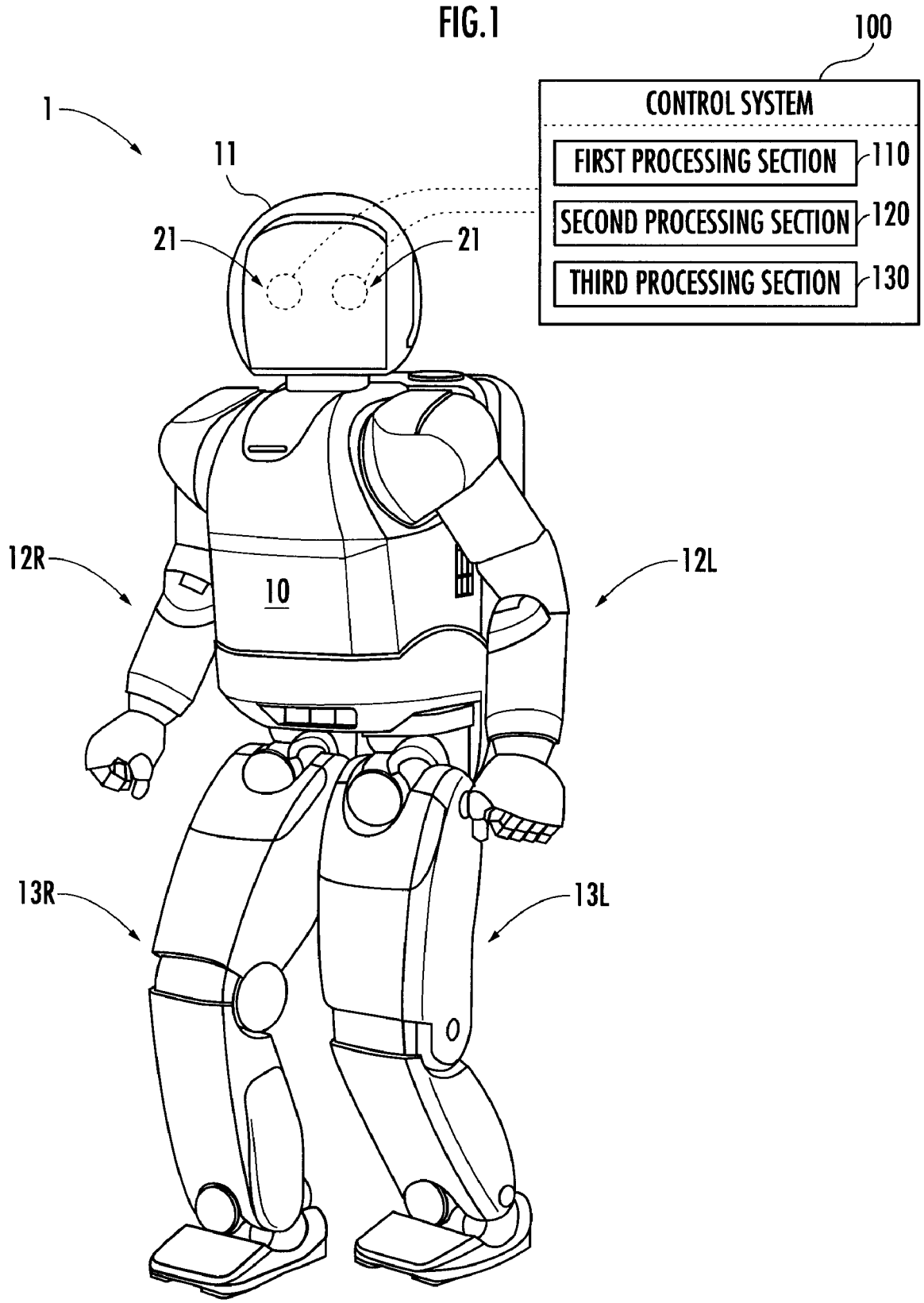
FIG. 1 is a diagram showing a configuration of a mobile apparatus according to the present invention.

First, a configuration of a robot, which is an embodiment of the present invention, will be described with reference to FIG. 1.

A robot 1 comprises a base body (trunk) 10, a head 11 disposed on top of the base body 10, left and right arms 12 extending from upper parts of the left and right sides of the base body 10, and left and right legs 13 extending downwardly from the bottom of the base body 10. Suffixes "L" and "R" indicate left and right, respectively. As disclosed in the domestic re-publications of PCT international publication for patent application Nos. 03/090978 and 03/090979, the robot 1 can bend the arms 12 and the legs 13 at a plurality of joint parts corresponding to a plurality of human joints including the shoulder joint, the elbow joint, the wrist joint, the hip joint, the knee joint and the ankle joint by force transmitted from an unillustrated actuator. The robot 1 can autonomously move by the movement of the left and right legs 13 involving lifting off and landing on the floor. The height of the head 11 can be adjusted by adjusting the angle of inclination of the base body 10 with respect to the vertical direction. The head 11 incorporates a pair of left and right CCD cameras 21 facing forward of the robot 1. The image pickup range of the CCD cameras 21 can be adjusted by rotation, inclination, or the like of the head 11 with respect to the base body 10 by means of an actuator.

The robot 1 further comprises a control system 100 for controlling the walking or running operation thereof. The control system 100 comprises an ECU or a computer (composed of a CPU, a ROM, a RAM and an I/O, for example) as hardware and a "control program" according to the present invention as software. The control program may be previously stored in a memory of the computer, or distributed or broadcasted from a server in a "supervisory system" according to the present invention to the computer via a network or an artificial satellite in response to a request signal transmitted from the robot 1 to the server and stored in the memory of the computer.

The control system 100 comprises a first processing section 110, a second processing section 120, and a third processing section 130.

The first processing section 110 recognizes the robot 1 and the position and the velocity thereof (the term "velocity" means the velocity vector defined by direction and length hereinafter) as a reference spatial element $Q_0$, a reference position O and a reference velocity $v_0$ on a discriminant plane, respectively. Furthermore, the first processing section 110 recognizes an object, such as a person, and the position and the velocity thereof as a first spatial element $Q_1$, an object position p and an object velocity v on the discriminant plane, respectively. Furthermore, the first processing section 110 recognizes, as a second spatial element $Q_2$, the first spatial element $Q_1$ intermittently or continuously extended based on the relative position of the object position p with respect to the reference position O and the relative velocity of the object velocity v with respect to the reference velocity $v_0$. The shape and the size of the reference spatial element $Q_0$ on the discriminant plane are read from a memory (not shown) and recognized.

Based on the result of recognition by the first processing section 110, the second processing section 120 determines whether or not there is a first spatial element $Q_1$ that satisfies a "contact condition" that there is a possibility of contact with the reference spatial element $Q_0$ on the discriminant plane.

If the second processing section 120 determines that there is a first spatial element $Q_1$ that satisfies the contact condition on the discriminant plane, the third processing section 130 determines a route that allows the reference spatial element $Q_0$ to avoid contact with the second spatial element $Q_2$ on the discriminant plane, which is referred to as "first action plan element", based on the result of recognition by the first processing section 110.

Now, functions of the robot configured as described above will be described with reference to FIGS. 2 to 9.

For example, the robot 1 is walking or running along a route $R_k$ as the first action plan element, which is set previously or set by the third processing section 130 as described later, as shown by the alternate long and short dash line in FIG. 6.

Figure 2:
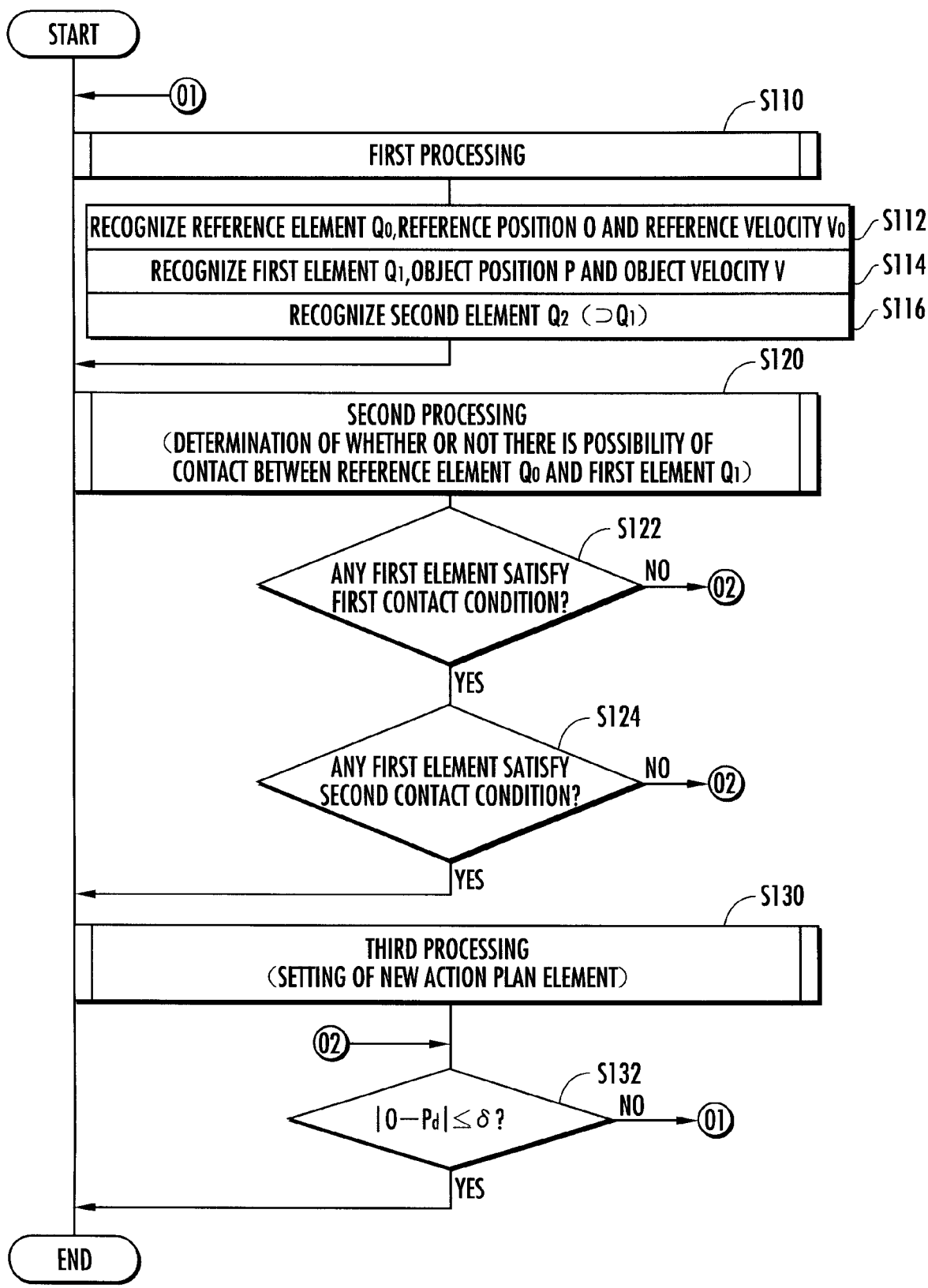
FIG. 2 is a diagram for illustrating functions of the mobile apparatus according to the present invention.

The first processing section 110 performs a "first processing" (S110 in FIG. 2).

The first processing section 110 recognizes the robot 1 and the position and the velocity thereof as the reference spatial element $Q_0$ on the discriminant plane, and the reference position O and the reference velocity $v_0$ in a robot coordinate system, respectively (S112 in FIG. 2). For example, as shown in FIG. 6, the robot 1 and the position and the velocity thereof are recognized as dots or small regions on the discriminant plane that represent the reference spatial element $Q_0$, the reference position O and the reference velocity $v_0$. As described later, the position of an object x measured based on an image obtained by the CCD cameras 21 is the relative position with respect to the robot 1, and therefore, the measurement of the position of the robot 1 is omitted. However, if the measured position of the object x is not the relative position, for example, if the measured position of the object x is represented by the latitude and longitude thereof, the position of the robot 1 is measured to measure the relative position. The position of the robot 1 is determined based on signals indicating the latitude and longitude thereof, which are provided by a GPS function thereof, or signals indicating the acceleration of the robot 1, which are successively output from a gyroscope. The velocity of the robot 1 can be determined based on a time series of measured positions of the robot 1, signals output from the gyroscope, or the angles of the joints of the legs 13 and an inverse dynamics model, for example.

Figure 3:
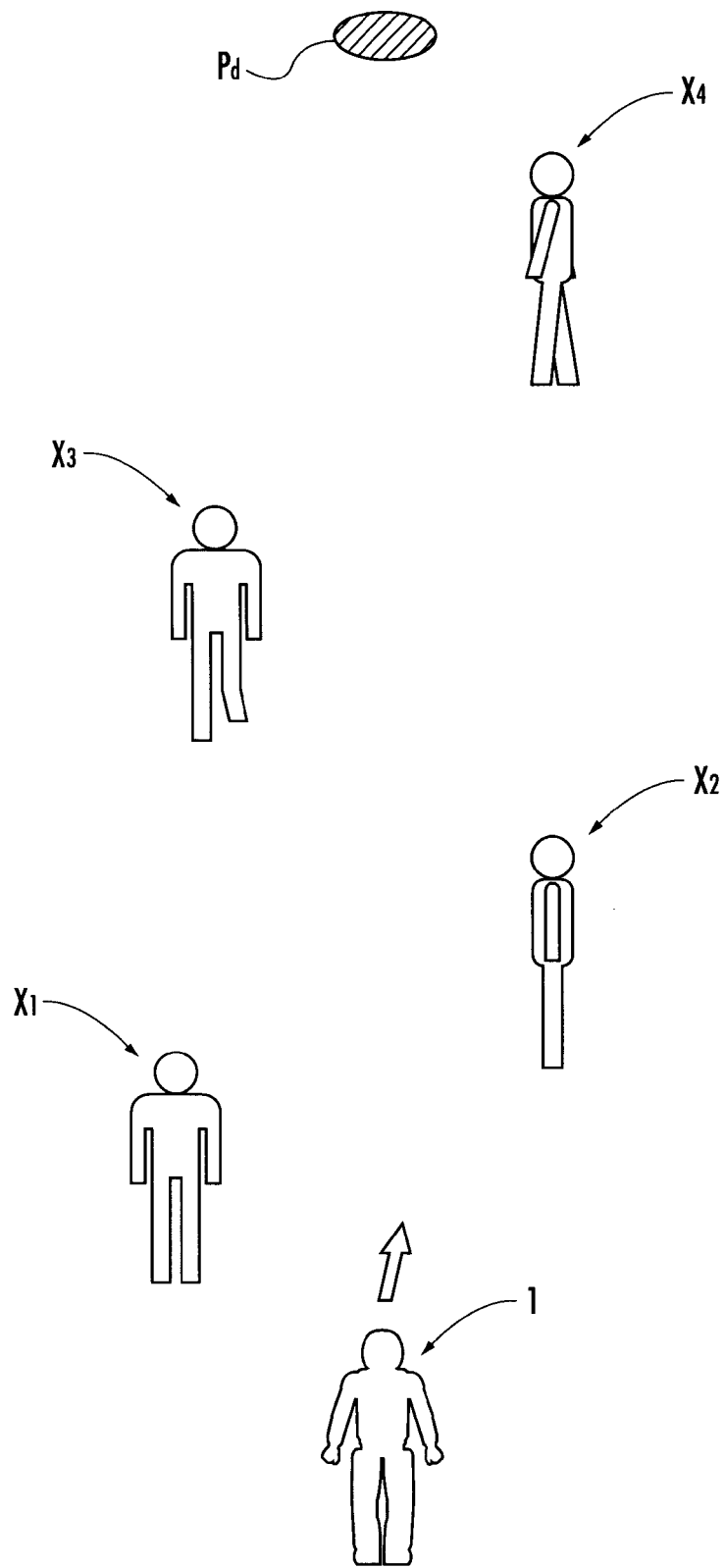
FIG. 3 is a diagram for illustrating functions of the mobile apparatus according to the present invention.
Figure 4:
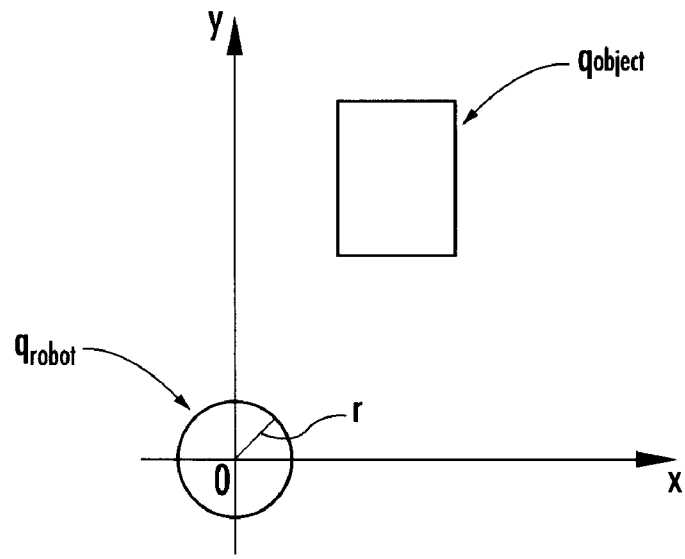
FIGS. 4(a)-4(b) are diagrams for illustrating functions of the mobile apparatus according to the present invention.
Figure 4:
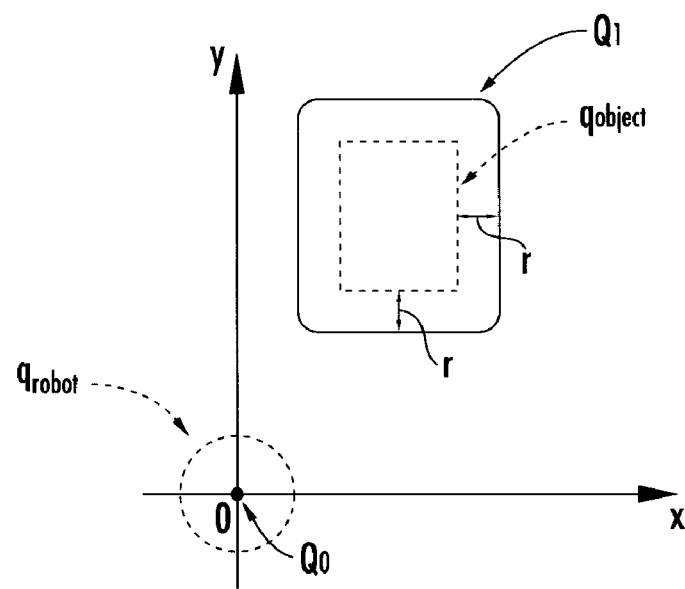
Figure 5:
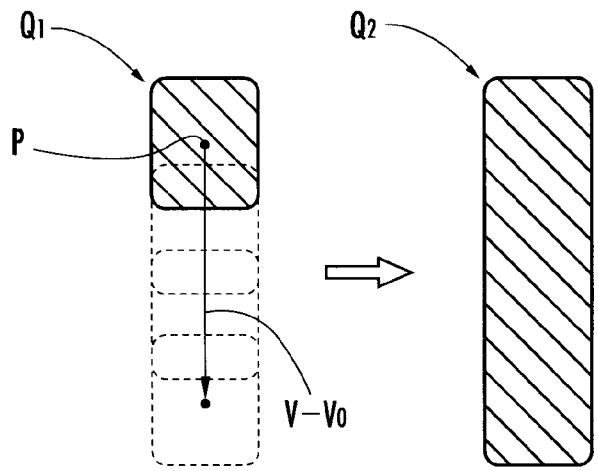
FIGS. 5(a)-5(c) are diagrams for illustrating functions of the mobile apparatus according to the present invention.
Figure 5:
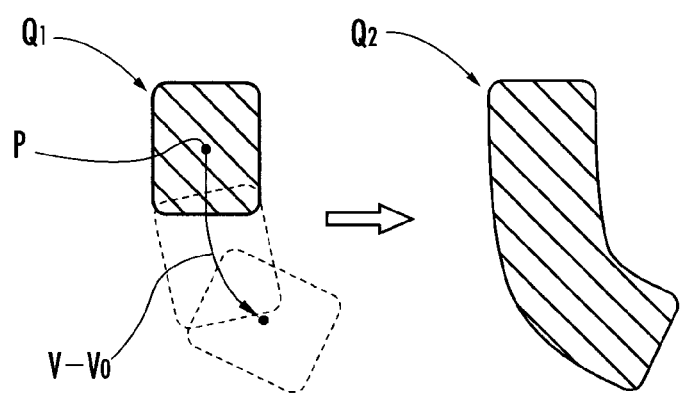
Figure 5:
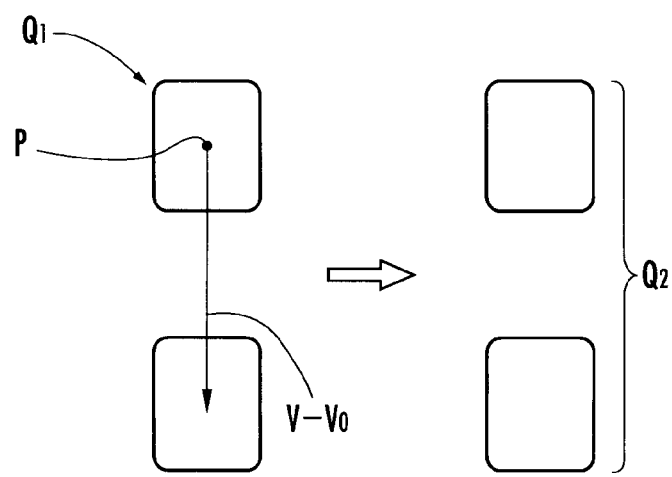

In addition, the first processing section 110 recognizes an object, such as a person, and the position and the velocity thereof as the first spatial element $Q_1$, the object position p and the object velocity v on the discriminant plane, respectively (S114 in FIG. 2). For example, as shown in FIG. 3, if there are objects $x_1$ to $x_4$ ahead of the robot 1 (in the image pickup range of the CCD cameras 21), the objects $x_1$ to $x_4$ and the positions and the velocity vectors thereof are recognized as first spatial elements (regions) $Q_{11}$ to $Q_{14}$, the object positions $p_1$ to $p_4$ and the object velocities $v_1$ to $v_4$ on the discriminant plane, respectively, as shown in FIG. 6. The position of the object x is determined by analysis of an image of the object x obtained by the CCD cameras 21. The position determined based on the image obtained by the CCD cameras 21 is the relative position with respect to the robot 1.

The shape and the size of the reference spatial element $Q_0$ on the discriminant plane can be read from a memory (which stores the shape and the size of the robot 1) and recognized. Furthermore, the shape and the size of the first spatial element Q1 on the discriminant plane can be recognized by recognizing the type (a human being, a dog (a small animal) or the like) of the object x based on the image obtained by the CCD cameras 21 and then inquiring of the memory or database (which stores or manages the types, the shapes and the sizes of objects associated with each other) about the result of the recognition. The shape and the size of the first spatial element $Q_1$ on the discriminant plane may be recognized by performing an arithmetic operation on the image data obtained by an image pickup device, such as the CCD cameras 21, according to an algorithm or the like that converts the (two-dimensional) image into a (three-dimensional) real space. Furthermore, the position of the object x may be measured or recognized based on a signal indicating the latitude and longitude thereof received from a communication device or the like on the object x. Furthermore, the velocity of the object x may be measured as a time variation of the position of the object x.

While the discriminant plane can be defined as a flat surface or curved surface in which any point can be specified by the latitude and longitude thereof, the discriminant plane may be appropriately defined based on the angle of inclination of the floor around the robot 1 or the condition of the floor, such as the presence or absence of steps or irregularities, which are recognized based on the image obtained by the CCD cameras 21.

In the case where another object, such as a box and a device, moves integrally with the robot 1, for example, in the case where the robot 1 holds a box with the arms 12, or in the case where an optional device for adding a function to the robot 1 is attached to the base body 10, the composite shape and the composite size of the robot 1 and the object moving integrally can be recognized as the shape and the size of the robot 1.

A region determined according to the contour characteristics (shape and size) of the object x on the discriminant plane that is extended according to the contour characteristics of the robot 1 is recognized as the first spatial element $Q_1$. More specifically, a Minkowski sum of two regions on the discriminant plate that have contour characteristics determined according to the contour characteristics of the robot 1 and the object x is recognized as the first spatial element $Q_1$. For example, in the case where the robot 1 and the object x are defined on the discriminant plane as a circular robot region $q_{robot}$ and a rectangular object region $q_{object}$ as shown in FIG. 4(a), respectively, a Minkowski sum of the two regions ($q_{robot}+q_{object}$), which is represented by a rounded rectangular region as shown in FIG. 4(b), is recognized as the first spatial element $Q_1$. Supposing that the robot region $q_{robot}$ moves around the object region $q_{object}$ in such a manner that the center of the robot region $q_{robot}$ follows the contour of the object region $q_{object}$, the Minkowski sum is equivalent to the sum of the object region $q_{object}$ and the annular region defined by the trajectory of the robot region $q_{robot}$ outside the object region $q_{object}$. The shape and the size of the robot region $q_{robot}$, which are associated with the size (or the shape and the size) of the robot 1, are previously stored in the memory and read from the memory and recognized. The object region $q_{object}$ is recognized as a region having a size determined by the size (or the shape and the size) of the object x recognized based on the image obtained by the CCD cameras 21. Alternatively, the object region $q_{object}$ may be directly recognized as the first spatial element $Q_1$, or an object region $q_{object}$ extended according to the contour characteristics, such as size, of the robot region $q_{robot}$, other than the Minkowski sum, may be recognized as the first spatial element $Q_1$.

Furthermore, the first processing section 110 recognizes the first spatial element $Q_1$ extended according to the reference position O, the object position p, the reference velocity $v_0$ and the object velocity v as the second spatial element $Q_2$ (S116 in FIG. 2). For example, as a result of the first spatial element $Q_1$ shown in the left part of FIG. 5(a) being continuously extended in the direction of the relative velocity (vector) $v-v_0$ of the object velocity v with respect to the reference velocity $v_0$, the second spatial element $Q_2$ having the shape of a substantially straight band shown in the right part of FIG. 5(a) is recognized. The amount of extension of the first spatial element $Q_1$ is determined by the velocity v of the first spatial element, the object position (relative position) p (=p−O), and the relative velocity $v-v_0$ according to the following formula (I).

$$\text{(amount of extension)} = |p| \cdot |v| / |v-v_0| \tag{1}$$

Similarly, as a result of the first spatial element $Q_1$ shown in the left part of FIG. 5(b) being continuously extended so that the first spatial element $Q_1$ slews in the direction of the relative velocity $v-v_0$, the second spatial element $Q_2$ having the shape of a bent band shown in the right part of FIG. 5(b) is recognized. In the situation shown in FIG. 3 described above, second spatial elements $Q_{21}$ to $Q_{24}$ shown in FIG. 6 are recognized. Alternatively, as a result of the first spatial element $Q_1$ shown in the left part of FIG. 5(c) being intermittently extended in the direction of the relative velocity $v-v_0$, the second spatial element $Q_2$ composed of separate spatial elements shown in the right part of FIG. 5(c) may be recognized. The extension part of the first spatial element $Q_1$ corresponds to a future image of the object predicted based on the behavior (position and velocity) of the object.

Then, the second processing section 120 performs a "second processing" to determine whether or not there is a possibility of contact between the reference spatial element $Q_0$ and the first spatial element $Q_1$ on the discriminant plane recognized by the first processing section 110, that is, whether or not there is a possibility of contact between the robot 1 and each object (S120 in FIG. 2).

The second processing section 120 determines whether or not there is a first spatial element $Q_1$ that satisfies a "first contact condition" concerning the movement cost of the reference spatial element $Q_0$ on the discriminant plane (S122 in FIG. 2).

The movement cost is evaluated by the third processing section 130 as a function of either or both of the time required for the reference spatial element to come into contact with the first spatial element on the discriminant plane and the distance at which the reference spatial element moves until the reference spatial element comes into contact with the first spatial element on the discriminant plane. As the movement cost, the linear distance or distance d along the route (shown by the alternate long and short dash line) from the reference spatial element $Q_0$ to each of the first spatial elements $Q_{11}$ to $Q_{14}$ shown in FIG. 6, the time $t (=(d/|v_0-v|))$ required for the reference spatial element $Q_0$ and each of the first spatial elements $Q_{11}$ to $Q_{14}$ moving at the reference velocity $v_0$ and the velocity $v$, respectively, to come into contact with each other, or the increasing function of either or both of the distance d and the required time t is evaluated.

Figure 6:
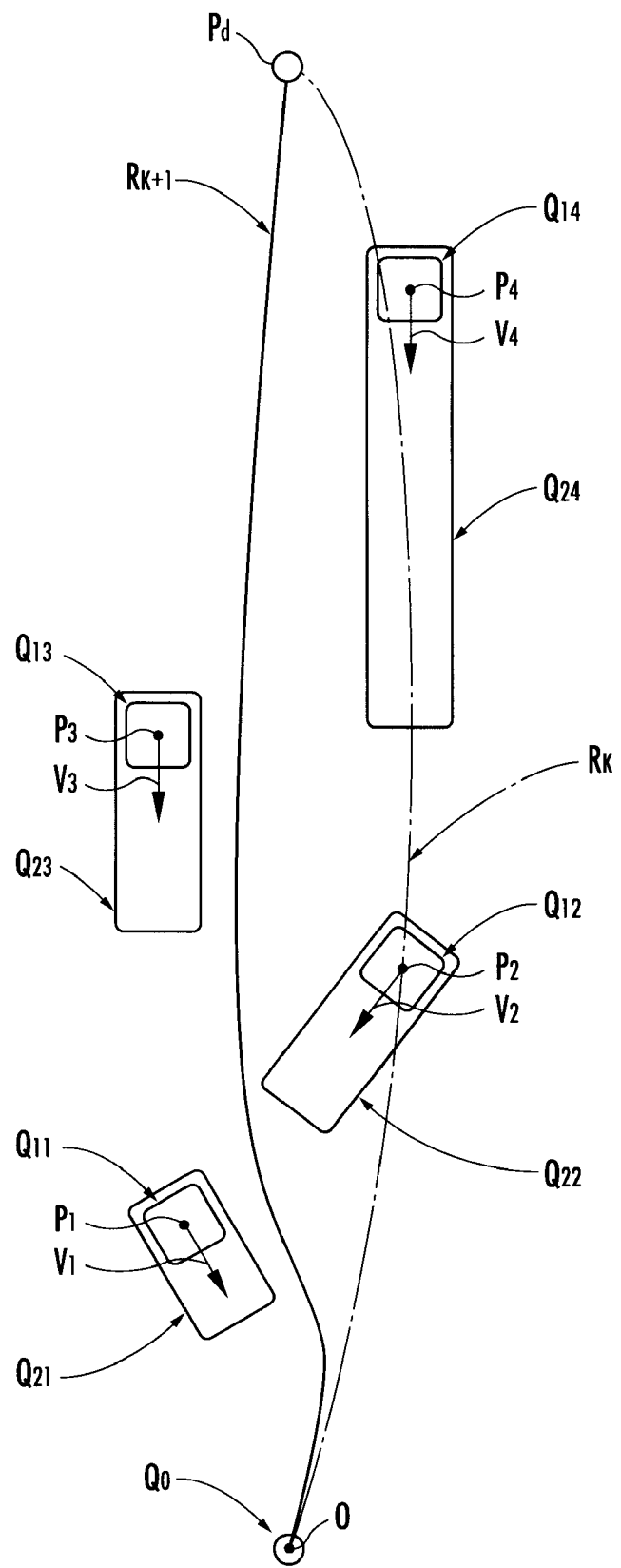
FIG. 6 is a diagram for illustrating functions of the mobile apparatus according to the present invention.

For example, consider a case where a first contact condition that the movement cost falls within a prescribed range $\{0, \epsilon_t (>0)\}$ is used, and the route $R_K$ shown by the alternate long and short dash line in FIG. 6 is set according to the latest action plan. In this case, it can be determined that, of the four first spatial elements $Q_{11}$ to $Q_{14}$, three first spatial elements $Q_{11}$ to $Q_{13}$ closer to the reference spatial element $Q_0$ satisfy the first contact condition.

If the second processing section 120 determines that there is a first spatial element $Q_1$ that satisfies the first contact condition (YES in S122 in FIG. 2), the second processing section 120 determines whether or not there is a first spatial element $Q_1$ that satisfies a "second contact condition" concerning the positional relationship between the first spatial element $Q_1$ and the route $R_K$ of the reference spatial element $Q_0$ from the reference position O to a target position $p_d$ on the discriminant plane set according to the action plan of the robot 1 (S124 in FIG. 2).

For example, consider a case where a second contact condition that there is an intersection or contact between the route $R_K$ and the first spatial element $Q_1$ is used, and the route $R_K$ shown by the alternate long and short dash line in FIG. 6 is set as a first action plan element. In this case, it is determined that, of the three first spatial elements $Q_{11}$ to $Q_{13}$ that satisfy the first contact condition described above, the first spatial element $Q_{12}$ that intersects with the route $R_K$ satisfies the second contact condition. The second contact condition may be that the shortest distance to the first spatial element $Q_1$ or a cumulative distance or an integral along a part or the whole of the route $R_K$ is equal to or smaller than a predetermined value, or that there is an intersection or contact between the first spatial element $Q_1$ and the tangent to the route $R_K$ at the reference position O (which extends in the direction of movement of the reference spatial element $Q_0$).

If there is a first spatial element $Q_1$ that satisfies both the first contact condition and the second contact condition as described above (if YES in S122 and S124 in FIG. 2), it is determined that there is a first spatial element $Q_1$ that can come into contact with the reference spatial element $Q_0$. Alternatively, it can also be determined that there is a first spatial element $Q_1$ that can come into contact with the reference spatial element $Q_0$, even if the first spatial element $Q_1$ satisfies only one of the first contact condition and the second contact condition.

If the second processing section 120 determines that there is a first spatial element $Q_1$ that satisfies the second contact condition (YES in S124 in FIG. 2), the third processing section 130 performs a "third processing" to set a new route for the reference spatial element $Q_0$ that allows the reference spatial element $Q_0$ to avoid contact with all the second spatial elements $Q_2$ as the first action plan element (S130 in FIG. 2).

As described above, in the example shown in FIG. 6, since one first spatial element $Q_{12}$ of the four first spatial elements $Q_{11}$ to $Q_{14}$ satisfies the first and the second contact condition, a new route $R_{K+1}$ that allows the reference spatial element $Q_0$ to avoid contact with all the second spatial elements $Q_{21}$ to $Q_{24}$ shown by the solid line is set as the first action plan element. In response to this, the robot 1 moves along the route $R_{K+1}$ as a new first action plan element shown by the solid line in FIG. 6 rather than the route $R_K$ as the previous first action plan element shown by the alternate long and short dash line in FIG. 6.

Furthermore, the third processing section 130 determines whether or not the distance $|O-p_d|$ between the reference position O and the target position $p_d$ of the reference spatial element $Q_0$ on the discriminant plane is equal to or less than a threshold value $\delta$, or in other words, whether or not the robot 1 has reached the target position (S132 in FIG. 2). Even if the result of the determination by the second processing section 120 is negative (if NO in S122 and S124 in FIG. 2), the determination (S132 in FIG. 2) is made.

Figure 7:
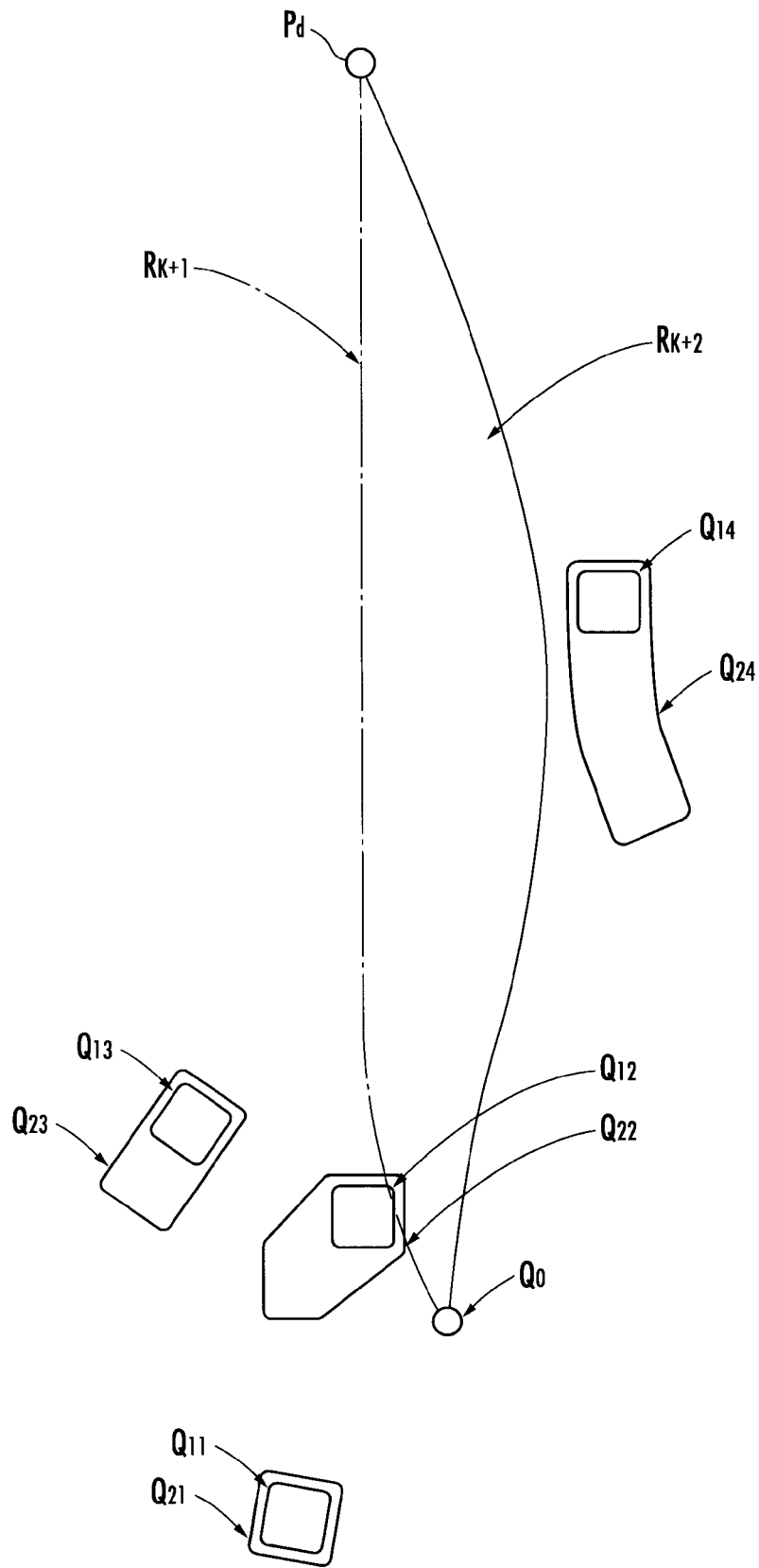
FIG. 7 is a diagram for illustrating functions of the mobile apparatus according to the present invention.

If the result of the determination is negative (if NO in S132 in FIG. 2), the first processing, the second processing and the like described above are performed again. For example, in the case where the situation shown in FIG. 6 changes to the situation shown in FIG. 7, and it is determined that one first spatial element $Q_{12}$ of the four first spatial elements $Q_{11}$ to $Q_{14}$ satisfies both the first and the second contact condition again, the route $R_{K+1}$ shown by the alternate long and short dash line as the previous first action plan element in FIG. 7 is changed to a new route $R_{K+2}$ shown by the solid line as a new first action plan element. On the other hand, the result of the determination is positive (if YES in S132 in FIG. 2), the procedure described above is ended.

The robot 1 capable of serving the functions described above is reduced in the frequency of change of the route $R_k$ as the first action plan element for the reasons described below.

The determination of whether the second contact condition is satisfied or not is made only for a first spatial element $Q_1$ that satisfies the first contact condition concerning the movement cost on the discriminant plane (see S122 (YES) and S124 in FIG. 2). Therefore, for a first spatial element $Q_1$ corresponding to an object x located far from the robot 1, the determination of whether the second contact condition is satisfied or not, and therefore, the determination of whether a route change is needed or not are not made. As a result, the frequency of change of the route $R_k$ is reduced compared with the case where the determination of whether the second contact condition is satisfied or not is made for all the first spatial elements $Q_1$.

In addition, it is a requirement for changing the route $R_k$ that at least one of the first spatial elements $Q_1$ that satisfy the first contact condition on the discriminant plane satisfies the second contact condition concerning the positional relationship between the first spatial element $Q_1$ and the current route (see S124 (YES) and S130 in FIG. 2). The first spatial element $Q_1$ is recognized as a relatively small spatial element on the discriminant plane (see FIGS. 5(a) to 5(c)). Therefore, the frequency of change of the route $R_k$ as the first action plan element is reduced compared with the case where the determination of whether the second contact condition is satisfied or not is made for a spatial element larger than the first spatial element $Q_1$, such as the second spatial element $Q_2$.

Furthermore, the shape and the size of the first spatial element $Q_1$ on the discriminant plane can be recognized by inquiry of the database or the like. Therefore, an object x can be prevented from being recognized as a first spatial element $Q_1$ having a size larger than the actual size of the object x on the discriminant plane because of the limit of the precision of measurement of the size (or the shape and the size) of the object x by the CCD cameras 21 or the like. As a result, the frequency of change of the route as the first action plan element, and accordingly, the frequency of change in the movement direction or the like of the robot 1 are reduced. In other words, frequent changes of the route of the robot 1 due to the limit of the recognition of the contour characteristics of the object x by the CCD cameras 21 or the like can be avoided.

The frequency of change of the route $R_k$ as the first action plan element is reduced as described above, and accordingly, the frequency of change in the behavior of the robot 1, such as change in the movement direction of the robot 1, is reduced. As a result, it is possible to prevent a change in the behavior of the robot 1 from inducing a change in the behavior of the object x, such as a person, and increasing the possibility of contact between the robot 1 and the object x. Furthermore, since the frequency of change of the route $R_k$ as the first action plan element is reduced, the information processing load involved with the route change can be reduced accordingly.

For the reasons described below, an appropriate route $R_{k+1}$ is set to avoid the contact between the robot 1 and the object x with reliability. As described above, in the case where there is at least one first spatial element $Q_1$ that satisfies both the first contact condition and the second contact condition on the discriminant plane, a new route $R_{k+1}$ that allows the reference spatial element $Q_0$ to avoid contact with the second spatial element $Q_2$ is set (see S122 (YES), S124 (YES) and S130 in FIG. 2, and FIGS. 6 and 7). The second spatial element $Q_2$ is recognized as a relatively large spatial element on the discriminant plane (see FIGS. 5(a) to 5(c)). Therefore, an appropriate route $R_{k+1}$ for avoiding contact between the robot 1 and the object x with reliability is set compared with the case where a new route for the reference spatial element $Q_0$ is set with respect to a spatial element smaller than the second spatial element $Q_2$, such as the first spatial element $Q_1$.

Furthermore, the shape and the size of the first spatial element $Q_1$ on the discriminant plane are recognized by inquiry of the database or the like, and the shape and the size of the second spatial element $Q_2$ are determined based on the shape and the size of the first spatial element $Q_1$. Therefore, the object x can be prevented from being recognized as a second spatial element $Q_2$ having a size larger than the actual size thereof on the discriminant plane because of the limit of the precision of measurement of the size of the object x by the CCD cameras 21 or the like. In addition, the route as the first action plan is prevented from being excessively frequently changed in order to avoid contact with the object x.

Now, there will be described an embodiment in which each of the spatial elements $Q_0$, $Q_1$ and $Q_2$ is recognized on each of a plurality of discriminant planes, rather than on one discriminant plane, and it is necessary for changing the first action plan element that there is a first spatial element $Q_1$ that satisfies the first and the second contact condition in any of the plurality of discriminant planes.

Figure 8:
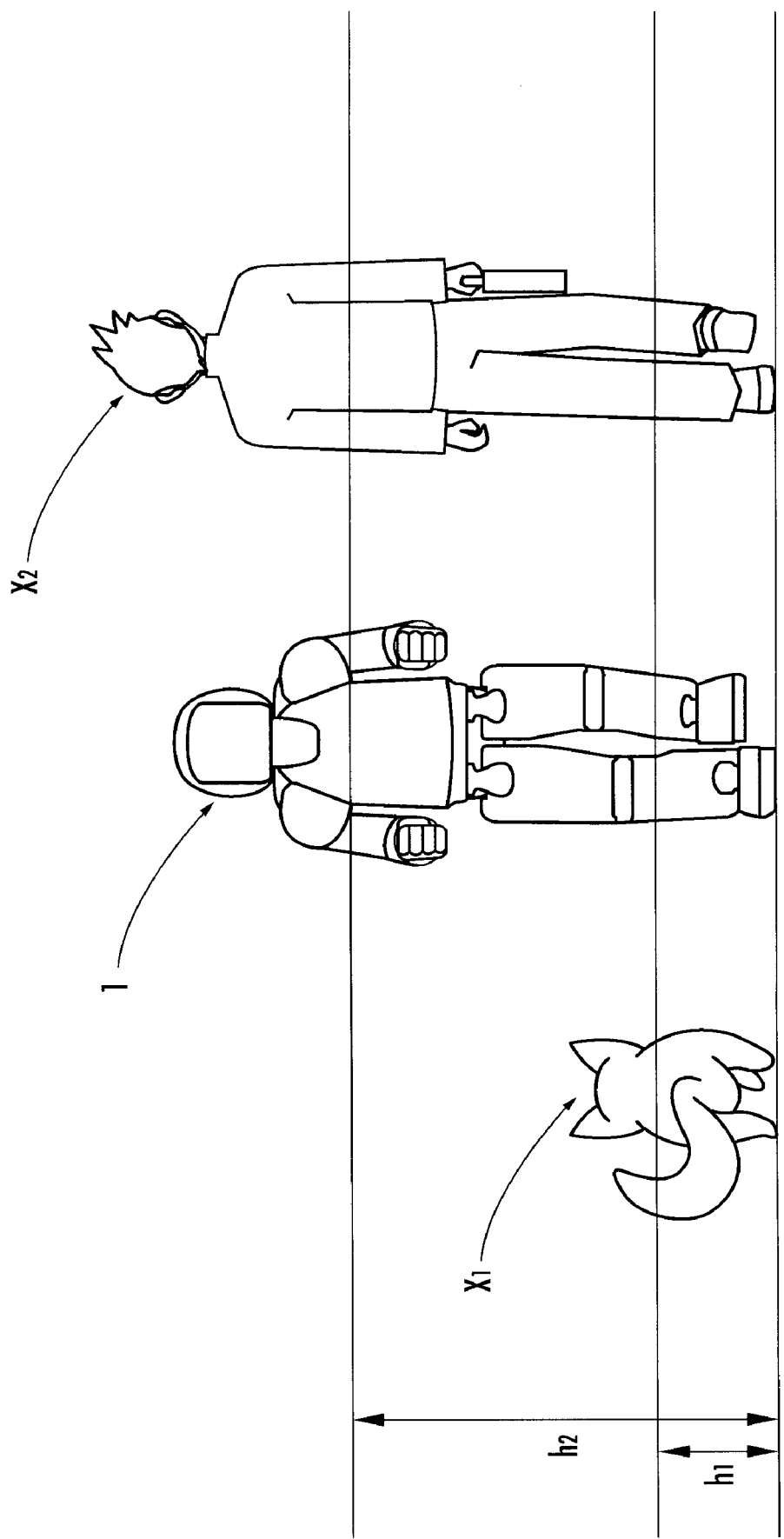
FIG. 8 is a diagram for illustrating functions of the mobile apparatus according to the present invention.
Figure 9:
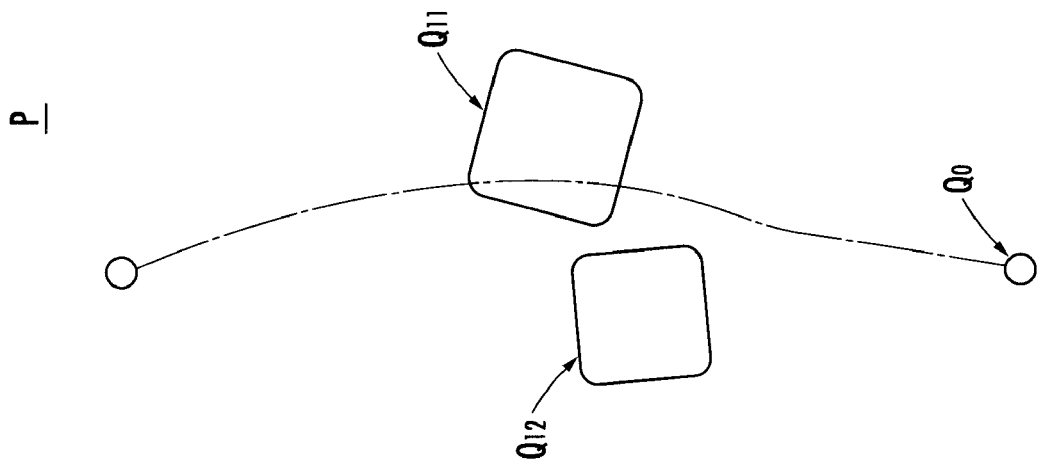
FIGS. 9(a)-9(c) are diagrams for illustrating functions of the mobile apparatus according to the present invention.
Figure 9:
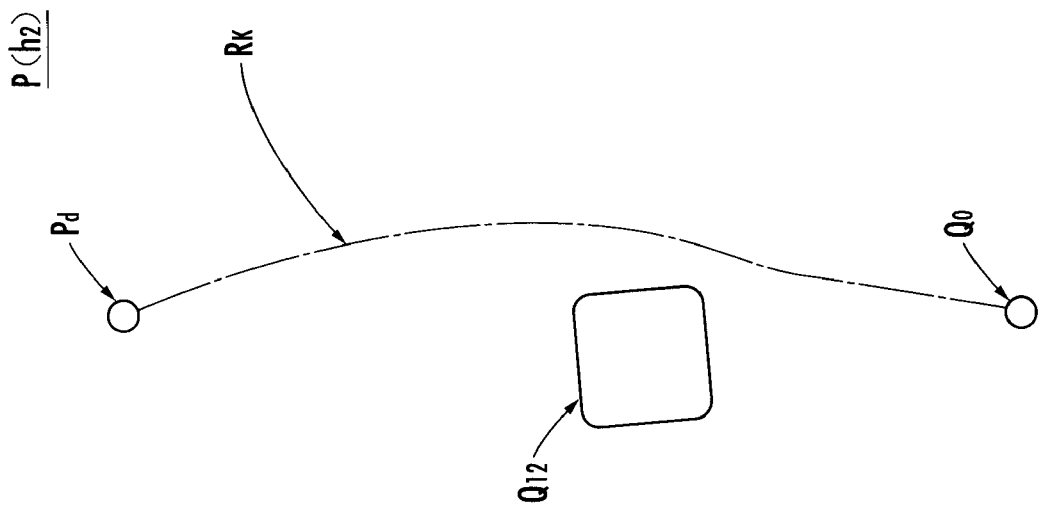
Figure 9:
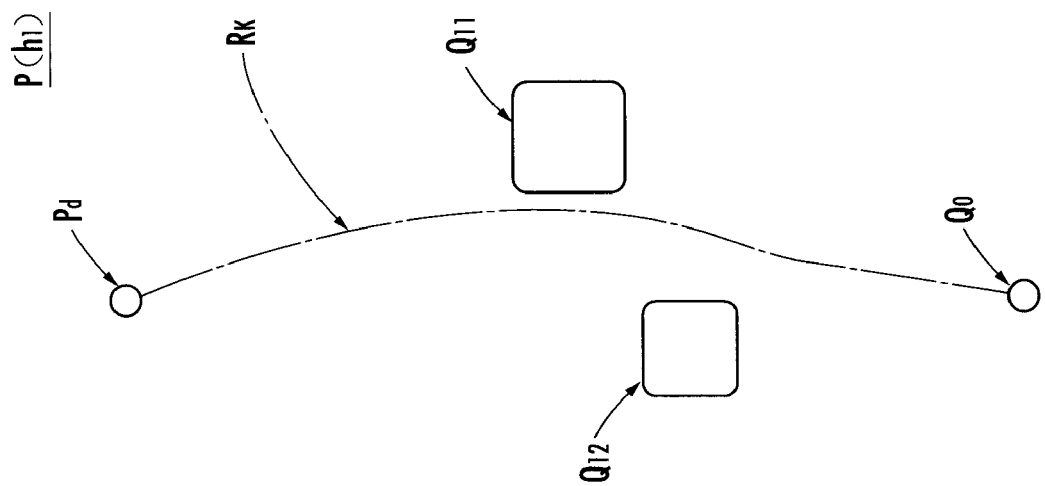

For example, there will be discussed a situation shown in FIG. 8 in which the robot 1 passes by a first object $x_1$ shorter than the robot 1, such as a cat and a dog, and a second object $x_2$ substantially as tall as the robot 1, such as a human being.

In this situation, if the first object $x_1$ and the second object $x_2$ are recognized on only one discriminant plane P, the reference spatial element $Q_0$ and the first spatial elements $Q_{11}$ and $Q_{12}$ shown in FIG. 9(c) can be recognized on the discriminant plane P. In this case, it can be determined that there is a first spatial element $Q_1$ that satisfies the first and the second contact condition, and the route $R_k$ can be changed to a new route $R_{k+1}$ (see S124 (YES) and S130 in FIG. 2). That is, since the three-dimensional contour characteristics of the robot 1 and the like are not taken into account, the first spatial element $Q_1$ is recognized as a large spatial element, and accordingly, the possibility that a new first action plan element is set to avoid contact between the robot 1 and the object x increases.

On the other hand, since the reference spatial element $Q_0$ or the like is recognized on each of the plurality of discriminant planes, the route can be changed at an appropriate frequency in view of the three-dimensional contour characteristics of the robot 1 and each object x, and an appropriate route can be set to avoid contact between the robot 1 and each object x with reliability.

For example, consider a case where the reference spatial element $Q_0$ or the like is recognized on each of a discriminant plane $P(h_1)$ at a height of $h_1$ and a discriminant plane $P(h_2)$ at a height of $h_2(>h_1)$ from a floor surface in the situation described above. In this case, on the discriminant plane $P(h_1)$, the first object $x_1$ and the second object $x_2$ are recognized as the first spatial elements $Q_{11}$ and $Q_{12}$, respectively, as shown in FIG. 9(a). On the discriminant plane $P(h_2)$ at the height of $h_2(>h_1)$, only the second object $x_2$ is recognized as the first spatial elements $Q_{12}$ as shown in FIG. 9(b).

On the discriminant plane $P(h_2)$, the first object $x_1$ is not recognized. This is because the height of the first object $x_1$ is lower than the height $h_2$.

In addition, the second object $x_2$ is recognized as a relatively large first spatial element $Q_{12}$ on the discriminant plane $P(h_2)$, while the second object $x_2$ is recognized as a relatively small first spatial element $Q_{12}$ on the discriminant plane $P(h_1)$. This is because the upper body of the robot 1 is larger than the lower body because of the presence of the arms 12 and the like (see FIG. 1), and the upper body of a human being, which is the second object $x_2$, is also larger than the lower body. In other words, the Minkowski sum of the robot region $q_{robot}$ and the object region $q_{object}$ on the discriminant plane $P(h_2)$, which includes the upper body of the robot 1 and the second object $x_2$, is larger than the Minkowski sum $(q_{robot}+q_{object})$ of the robot region $q_{robot}$ and the object region $q_{object}$ on the discriminant plane $P(h_1)$, which includes the lower body of the robot 1 and the second object $x_2$ (see FIG. 4). It is determined that there is no first spatial element $Q_1$ that satisfies the second contact condition because no first spatial element $Q_1$ intersects with the route $R_k$ extending from the reference spatial element $Q_0$ to the target position $p_d$ on both the two discriminant planes $P(h_1)$ and $P(h_2)$, and the route $R_k$ as the first action plan element is not changed (see S124 (NO) in FIG. 2).

Thus, the route $R_k$ can be changed at an appropriate frequency in view of the three-dimensional shape and the size of the robot 1 and the objects x. In general, the robot 1 and the objects x each have contour characteristics that the shape and the size vary with the position thereof, such as the height from the floor surface. Therefore, the shape and the size of the robot 1 and the objects x at different positions (heights) can be reflected in the shape and the size of the first spatial element $Q_1$ recognized on each of the plurality of discriminant planes. Thus, a route $R_k$ as the first action plan element can be changed at an appropriate frequency to avoid contact between the robot 1 recognized as the reference spatial element $Q_0$ and the object x recognized as the first spatial element $Q_1$ in view of the three-dimensional contour characteristics and the behavior, such as the position and the velocity, of the robot 1 and the object x.

Furthermore, a route $R_{k+1}$ that allows the reference spatial element $Q_0$ to avoid contact with the second spatial element $Q_2$ on all of the plurality of discriminant planes is set as the first action plan element. Therefore, an appropriate route $R_{k+1}$ for avoiding contact between the robot 1 and the object can be set in view of the three-dimensional shape and the size of the robot 1 and the object.

Therefore, the robot 1 can continue moving by avoiding contact with an object x, such as a person, while reducing the possibility that the movement of the robot 1 induces a change in the behavior of the object x.

Furthermore, the Minkowski sum $(q_0+q)$ of the two regions $q_0$ and q determined according to the contour characteristics of the robot 1 and the object x is recognized as the first spatial element $Q_1$. Therefore, the size and the shape of the robot 1 and the object x can be collectively reflected in the size and the shape of the first spatial element $Q_1$ on each discriminant plane. Thus, the precision of the determination of whether there is a first spatial element $Q_1$ that can come into contact with the reference spatial element $Q_0$ or not can be improved or maintained while simplifying the handling of the reference spatial element $Q_0$ on the discriminant plane as a dot or a small region and therefore the determination process, for example.

The control method described above can be applied not only to the robot that moves by the movement of a pair of left and right legs, such as the robot 1, but also to any mobile apparatus, such as a robot that moves by the movement of three or more legs and a wheeled mobile robot (automobile).

If the lower limit of the prescribed range of the movement cost is set at a positive value rather than 0, when the movement cost is lower than the lower limit, the first contact condition is not satisfied, and the route $R_k$ as a new first action plan element is not changed (see S122 (NO) in FIG. 2). Therefore, when the object x is located near the robot 1, and therefore, a change in the behavior of the robot 1 can induce a change in the behavior of the object x to increase the possibility of contact between the robot 1 and the object x, the movement direction of the robot 1 is not changed.

Now, a mobile apparatus according to another embodiment of the present invention will be described with reference to FIGS. 10(a) to 16(b). According to this embodiment, a robot 1 controls the posture thereof based on a "second action plan element".

A first processing section 110 recognizes a reference spatial element $Q_0$, a first spatial element $Q_1$ and a second spatial element $Q_2$ on a discriminant plane including at least part of a representative point trajectory tr of the robot 1, which is determined based on the second action plan element.

A second processing section 120 determines whether or not there is a first spatial element $Q_1$ that satisfies the first and second contact conditions from the result of the recognition by the first processing section 110.

When the second processing section 120 determines that there is a first spatial element $Q_1$ that satisfies the contact conditions, a third processing section 130 assumes a change of the second action plan element involving a change of the representative point trajectory tr. That is, this embodiment differs from the embodiment described above in that the third processing section 130 does not change the route, which is the first action plan element, immediately after the second processing section 120 determines that there is a first spatial element $Q_1$ that satisfies the contact conditions as described above.

On the assumption that the posture of the robot 1 is controlled based on the changed second action plan element assumed by the third processing section 130, the first processing section 110 recognizes the reference spatial element $Q_0$, the first spatial element $Q_1$ and the second spatial element $Q_2$ again on the discriminant plane including at least part of the representative point trajectory tr.

Based on the result of the recognition by the first processing section 110 under the assumption, the second processing section 120 determines whether or not there is a first spatial element $Q_1$ that satisfies the contact conditions on the discriminant plane.

When the second processing section 120 determines, under the assumption, that there is a first spatial element $Q_1$ that satisfies the contact conditions, the third processing section 130 sets a route $R_{k+1}$ that allows the reference spatial element $Q_0$ to avoid contact with the second spatial element $Q_2$ on the discriminant plane as a first action plan element based on the result of the recognition by the first processing section 110. On the other hand, when the second processing section 120 determines, under the assumption, that there is no first spatial element $Q_1$ that satisfies the contact conditions, the third processing section 130 sets the assumed second action plan element.

Now, functions of the robot 1 configured as described above will be described with reference to FIGS. 10 to 16.

First, there will be discussed a case where a wave-like upper end trajectory $tr_1$ (not changed) of a head (first part) 11 is defined as the second action plan element as shown in FIG. 10(a), and it is determined whether or not there is a first spatial element $Q_1$ that satisfies the first and second contact conditions on a wave-like first discriminant plane $P_1$ (not changed) including the whole of the upper end trajectory $tr_1$ (not changed) shown in FIG. 16(a). The upper end trajectory $tr_1$ (not changed) of the head 11 is wave-like because the head 11 moves vertically when a posture change involving a change in angle of the knee joints of the legs 13 in contact with the floor, for example, occurs. The "first part" of the robot 1 may be left and right arms 12, rather than the head 11. Furthermore, a plane including only part of the wave-like upper end trajectory $tr_1$ (not changed) (a group of maximum or minimum points of the wave, for example), rather than the whole thereof, may be defined as the first discriminant plane $P_1$ (not changed) as shown in FIG. 16(b).

Referring to FIG. 10(a), the upper end trajectory $tr_1$ (not changed) of the head 11 intersects with an object x. Therefore, if the robot 1 continues to move according to the current first and second action plan elements, the head 11 comes into contact with the object x as shown by the dashed line in FIG.

11(*a*). Thus, the second processing section 120 determines that there is a first spatial element $Q_1$ that satisfies not only the first contact condition but also the second contact condition that there is an intersection between the route $R_k$, which is the first action plan element, and the first spatial element $Q_1$ on the first discriminant plane $P_1$ (not changed) as shown in FIG. 11(*b*). The route $R_k$, which is the first action plan element, may be the same as the upper end trajectory $tr_1$ (not changed) of the head 11, which is the second action plan element.

In response to the positive result of the determination by the second processing section 120, the third processing section 130 assumes a second action plan element for lowering the upper end trajectory $tr_1$ (not changed) of the head 11. Thus, as the second action plan element, there is assumed an upper end trajectory $tr_1$ (changed) of the head 11 that makes the robot 1 move in a forward leaning posture with the head 11 lowered by increasing the angle of inclination of a base body 10 with respect to the vertical direction at least in a section from a point s01 to a point s02 shown in FIG. 11(*b*) as shown in FIG. 10(*b*).

Then, under the assumption, the first processing section 110 recognizes the reference spatial element $Q_0$ or the like on the wave-like first discriminant plane $P_1$ (changed) including the wave-like upper end trajectory $tr_1$ (changed) of the head 11 (see S110 in FIG. 2).

The upper end trajectory $tr_1$ (changed) of the head 11 shown in FIG. 10(*b*) does not intersect with the object x. Thus, if the robot 1 moves according to the assumed second action plan element, the head 11 is located under the object x as shown by the solid line in FIG. 11(*a*). Thus, the second processing section 120 determines that there is no first spatial element $Q_1$ that satisfies the second contact condition that there is a contact or intersection between the first spatial element $Q_1$ and the route $R_k$, which is the first action plan element, on the first discriminant plane $P_1$ (changed) as shown in FIG. 11(*c*).

Based on the result of the determination by the second processing section 120, the third processing section 130 sets the assumed second action plan element. Thus, as the second action plan element, there is set the upper end trajectory $tr_1$ (changed) of the head 11 that makes the robot 1 move in a forward leaning posture with the head 11 lowered by increasing the angle of inclination of the base body 10 with respect to the vertical direction as shown in FIG. 10(*b*), for example. The robot 1 moves by controlling the posture according to the new second action plan element. Thus, the robot 1 can move to the target position while avoiding contact with the object x without changing the route $R_k$, which is the first action plan element. In addition, since the frequency of changes in the movement direction of the robot 1 is reduced, the possibility of inducing an unexpected change in the behavior of the object x can be reduced.

On the other hand, when the second processing section 120 determines that there is a first spatial element $Q_1$ that satisfies the first and second contact conditions on the first discriminant plane $P_1$ (changed), the third processing section 130 sets a route $R_{k+1}$ for the reference spatial element $Q_0$ that allows the reference spatial element $Q_0$ to avoid contact with the second spatial element $Q_2$ as a new first action plan element as described above (see S130 in FIG. 2 and FIG. 6). The robot 1 can move to the target position while avoiding contact with the object x by following the changed route $R_{k+1}$ as the first action plan element.

Figure 16:
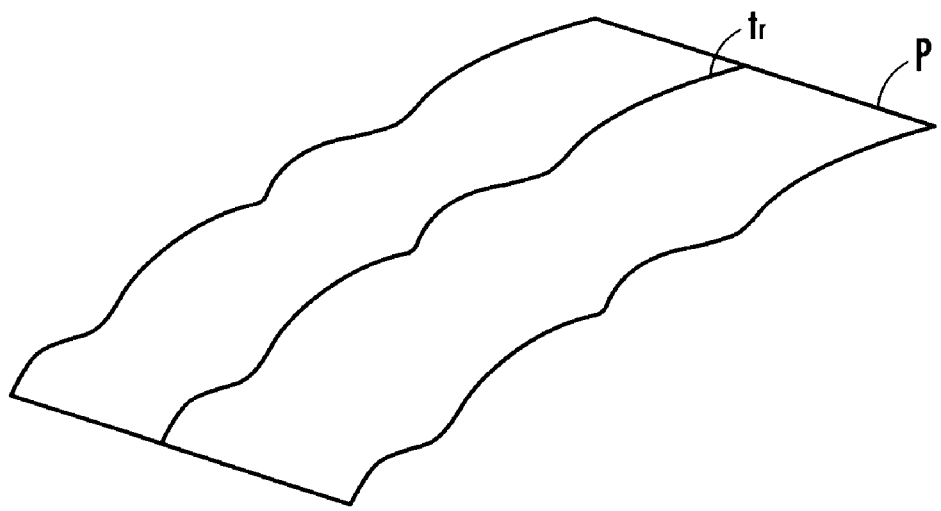
FIGS. 16(a)-16(b) are diagrams for illustrating functions of the mobile apparatus according to the present invention.
Figure 16:
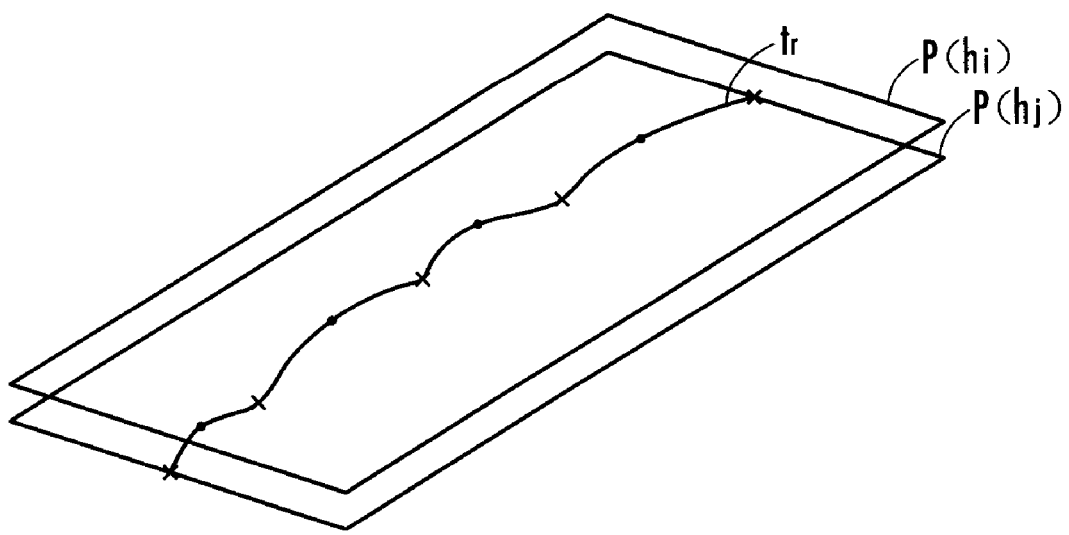

Furthermore, there will be discussed a case where a wave-like lower end trajectory $tr_2$ (not changed) of a right leg (second part) 13R moving vertically is set as the second action plan element as shown in FIG. 12(*a*), and it is determined whether or not there is a first spatial element $Q_1$ that satisfies the first and second contact conditions on a wave-like second discriminant plane $P_2$ (not changed) including the whole of the lower end trajectory $tr_2$ (not changed) (see FIG. 16(*a*)). The lower end trajectory $tr_2$ (not changed) of the leg 13 vertically moves like a wave because the robot 1 repeatedly lifts the leg 13 up from and puts it down on the floor when moving. The "second part" of the robot 1 may be the pair of legs 13, rather than one leg 13, or an arm 12.

Figure 13:
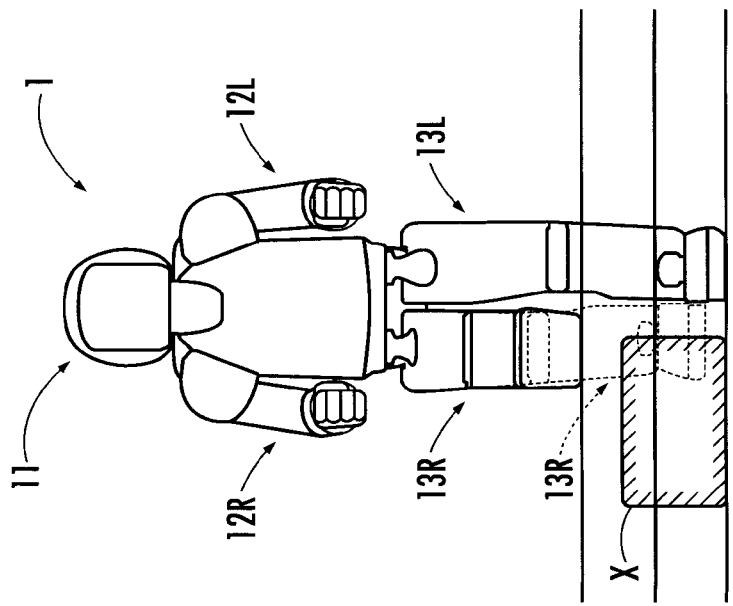
FIGS. 13(a)-13(c) are diagrams for illustrating functions of the mobile apparatus according to the present invention.
Figure 13:
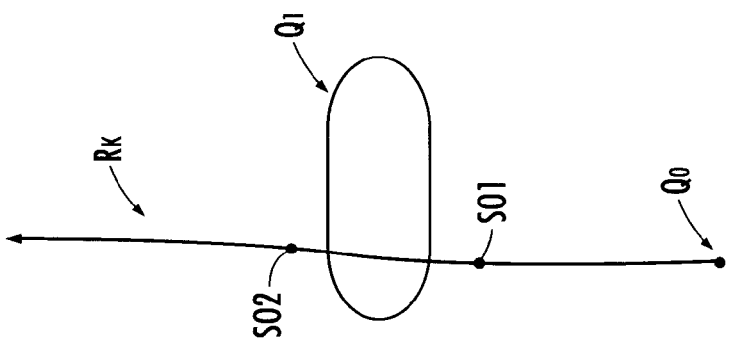
Figure 13:
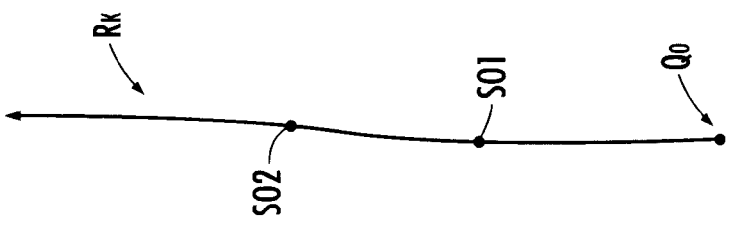

Referring to FIG. 12(*a*), the lower end trajectory $tr_2$ (not changed) of the right leg 13R intersects with an object x. Therefore, if the robot 1 continues to move according to the current first and second action plan elements, the right leg 13R comes into contact with the object x (the robot 1 stumbles over the object x) as shown by the dashed line in FIG. 13(*a*). Thus, the second processing section 120 determines that there is a first spatial element $Q_1$ that satisfies not only the first contact condition but also the second contact condition that there is an intersection between the route $R_k$, which is the first action plan element, and the first spatial element $Q_1$ on the second discriminant plane $P_2$ (not changed) as shown in FIG. 13(*b*). The route $R_k$, which is the first action plan element, may be the same as the lower end trajectory $tr_2$ (not changed) of each leg 13, which is the second action plan element.

In response to the positive result of the determination by the second processing section 120, the third processing section 130 assumes a second action plan element for raising the lower end trajectory $tr_2$ (not changed) of the right leg 13R. Thus, as the second action plan element, there is assumed a lower end trajectory $tr_2$ (changed) of the right leg 13R that makes the robot 1 move by striding over the object x by lifting the right leg 13R being away from the floor so as to be higher than normal at least in a section from a point s01 to a point s02 shown in FIG. 13(*b*) as shown in FIG. 12(*b*). In this case, it is a requirement for assuming the second action plan element that the distance of the section from the point s01 to the point s02 shown in FIG. 13(*b*) is smaller than the stride of the robot 1.

Then, under the assumption, the first processing section 110 recognizes the reference spatial element $Q_0$ or the like on the wave-like second discriminant plane $P_2$ (changed) including the wave-like lower end trajectory $tr_2$ (changed) of the right leg 13R (see S110 in FIG. 2).

The lower end trajectory $tr_2$ (changed) of the right leg 13R shown in FIG. 12(*b*) does not intersect with the object x. Thus, if the robot 1 moves according to the assumed second action plan element, the right leg 13R is located above the object x as shown by the solid line in FIG. 13(*a*). Thus, the second processing section 120 determines that there is no first spatial element $Q_1$ that satisfies the second contact condition that there is a contact or intersection between the first spatial element $Q_1$ and the route $R_k$, which is the first action plan element, on the second discriminant plane $P_2$ (changed) as shown in FIG. 13(*c*).

In response to the negative result of the determination by the second processing section 120, the third processing section 130 sets the assumed second action plan element. Thus, the lower end trajectory $tr_2$ (changed) of the right leg 13R shown in FIG. 12(*b*) is set as the second action plan element, for example. As required, the second action plan element may involve adjusting the stride of the robot 1 at some distance to the object x to enable the robot 1 to stride over the object x. The robot 1 moves by controlling the posture according to the new second action plan element. Thus, the robot 1 can move to the target position while avoiding contact with (stumbling over) the object x without changing the route $R_k$, which is the first action plan element. In addition, since the frequency of changes in the movement direction of the robot 1 is reduced, the possibility of inducing an unexpected change in the behavior of the object x can be reduced.

On the other hand, when the second processing section 120 determines that there is a first spatial element $Q_1$ that satisfies the first and second contact conditions on the second discriminant plane $P_2$ (changed), the third processing section 130 sets a route $R_{k+1}$ for the reference spatial element $Q_0$ that allows the reference spatial element $Q_0$ to avoid contact with the second spatial element $Q_2$ as a new first action plan element as described above (see S130 in FIG. 2 and FIG. 6). The robot 1 can move to the target position while avoiding contact with the object x by following the changed route $R_{k+1}$ as the first action plan element.

Furthermore, there will be discussed a case where a wave-like right end trajectory $tr_3$ (not changed) of a right arm (third part) 12R is set as the second action plan element as shown in FIG. 14(*a*), and it is determined whether or not there is a first spatial element $Q_1$ that satisfies the first and second contact conditions on a wave-like third discriminant plane $P_3$ (not changed) including the whole of the right end trajectory $tr_3$ (not changed) (see FIG. 16(*a*)). The right end trajectory $tr_3$ (not changed) of the arm 12 moves horizontally like a wave because the robot 1 swings the arm 12 to keep the stable posture when moving. The "third part" of the robot 1 may be the pair of arms 12, rather than one arm 12, or a leg 13.

Referring to FIG. 14(*a*), the right end trajectory $tr_3$ (not changed) of the right arm 12R intersects with an object x. Therefore, if the robot 1 continues to move according to the current first and second action plan elements, the right arm 12R comes into contact with the object x as shown by the dashed line in FIG. 15(*a*). Thus, the second processing section 120 determines that there is a first spatial element $Q_1$ that satisfies not only the first contact condition but also the second contact condition that there is an intersection between the route $R_k$, which is the first action plan element, and the first spatial element $Q_1$ on the third discriminant plane $P_3$ (not changed) as shown in FIG. 15(*b*).

In response to the positive result of the determination by the second processing section 120, the third processing section 130 assumes a second action plan element for shifting leftward the right end trajectory $tr_3$ (not changed) of the right arm 12R. Thus, as the second action plan element, there is assumed a right end trajectory $tr_3$ (changed) of the right arm 12R that makes the robot 1 move the right arm 12R leftward at least in a section from a point s01 to a point s02 shown in FIG. 15(*b*) as shown in FIG. 14(*b*).

Then, under the assumption, the first processing section 110 recognizes the reference spatial element $Q_0$ or the like on the wave-like third discriminant plane $P_3$ (changed) including the wave-like right end trajectory $tr_3$ (changed) of the right arm 12R (see S110 in FIG. 2).

The right end trajectory $tr_3$ (changed) of the right arm 12R shown in FIG. 14(*b*) does not intersect with the object x. Thus, if the robot 1 moves according to the assumed second action plan element, the right arm 12R is located horizontally away from the object x as shown by the solid line in FIG. 15(*a*). Thus, the second processing section 120 determines that there is no first spatial element $Q_1$ that satisfies the second contact condition that there is a contact or intersection between the first spatial element $Q_1$ and the route $R_k$, which is the first action plan element, on the third discriminant plane $P_3$ (changed) as shown in FIG. 15(*c*).

In response to the negative result of the determination by the second processing section 120, the third processing section 130 sets the assumed second action plan element. Thus, the right end trajectory $tr_3$ (changed) of the right arm 12R shown in FIG. 14(*b*) is set as the second action plan element, for example. The robot 1 moves by controlling the posture according to the new second action plan element. Thus, the robot 1 can move to the target position while avoiding contact with the object x without changing the route $R_k$, which is the first action plan element. In addition, since the frequency of changes in the movement direction of the robot 1 is reduced, the possibility of inducing an unexpected change in the behavior of the object x can be reduced.

On the other hand, when the second processing section 120 determines that there is a first spatial element $Q_1$ that satisfies the first and second contact conditions on the third discriminant plane $P_3$ (changed), the third processing section 130 sets a route $R_{k+1}$ for the reference spatial element $Q_0$ that allows the reference spatial element $Q_0$ to avoid contact with the second spatial element $Q_2$ as a new first action plan element as described above (see S130 in FIG. 2 and FIG. 6). The robot 1 can move to the target position while avoiding contact with the object x by following the changed route $R_{k+1}$ as the first action plan element.

Determination of whether there is a first spatial element $Q_1$ that satisfies the contact condition on a discriminant plane arbitrarily selected from among one or more first discriminant planes $P_1$, one or more second discriminant planes $P_2$ and one or more third discriminant planes $P_3$ and change of the first or second action plan element based on the result of the determination can be performed in an arbitrary combination. In this case, the robot 1 can move while maintaining a stable posture and avoiding contact with the object x by controlling the posture in various ways, such as assuming a forward leaning posture with the head 11 lowered and lifting the leg 13 being away from the floor so as to be higher than normal.

Furthermore, a condition that the rate of change of either or both of the direction and the magnitude of the velocity of the reference spatial element $Q_0$, that is, the robot 1, is equal to or lower than a threshold value can be set as a (additional) first action plan element. In this case, an excessive change of the velocity of the robot 1 caused by a change of the first action plan element and a change in the behavior of the robot 1 caused thereby can be suppressed. In addition, the possibility can be avoided that the behavior of the robot 1 induces an unexpected change in the behavior of the object x to increase the possibility of contact between the robot 1 and the object x. Furthermore, the possibility can be avoided that the robot 1 is forced to change the velocity and, therefore, the behavior beyond the capacity thereof.

Furthermore, the first action plan element can also be set in such a manner that a higher priority is given to changing the magnitude of the velocity of the reference spatial element $Q_0$, that is, the robot 1 than changing the direction thereof. In this case, a higher priority is given to changing the magnitude of the velocity (speed) of the robot 1 than changing the direction thereof because a change of the direction of the velocity (movement direction) of the robot 1 is more likely to induce a change in the behavior of the object. Thus, the possibility that a change in the behavior of the robot 1 induces a change in the behavior of the object x is reduced.

Furthermore, the third processing section 130 can prepare an announcement of the movement direction of the robot 1 as a "third action plan element", and the control system 100 can control the operation of the equipment on the robot 1 according to the third action plan. For example, the operation of actuators installed in the robot 1 can be controlled to previously announce the movement direction of the robot 1 in the form of the movement of the movable parts corresponding to parts of a human body, such as the base body 10, the head 11, the arms 12 and the legs 13, according to the third action plan element. In this case, the person (object x) can naturally clearly recognize the movement direction of the robot 1 from a familiar action, such as changing the direction of the front (face) of the head 11, changing the posture of the arms 12, and twisting the upper part of the base body 10 with respect to the lower part. As a result, the possibility can be reduced that a movement of the robot 1 induces a movement of the object x, such as a change in the movement direction, to cause contact between the robot 1 and the object x. Alternatively, the robot 1 can be equipped with a direction indicator, a light emitting device, a sound outputting device or the like, and the operation of the direction indicator, the light emission of the light emitting device or the sound output of the sound outputting device can be controlled according to the third action plan element to announce the movement direction of the robot 1.

What is claimed is:

1. A mobile apparatus that has a control system, and adjusts independently a position and a posture thereof according to a first action plan element defining a position-variation mode and a second action plan element defining a posture-variation mode, respectively, with a movement thereof controlled by the control system, wherein said control system comprises:

a first processing section which recognizes a current image of said mobile apparatus, a current image of an object, and an intermittent or continuous future image of the object, which is determined according to the behavior of the object and has a larger size than the current image thereof, as a reference spatial element, a first spatial element and a second spatial element having a larger size than the first spatial element, respectively, on a discriminant plane including at least a part of an end point trajectory of said mobile apparatus determined based on said second action plan element;

a second processing section which determines, based on the result of the recognition by the first processing section, whether or not there is the first spatial element that satisfies a contact condition which refers to a second contact condition that there exists an intersection point or contact point between the reference spatial element and the first spatial element on the discriminant plane when the reference spatial element moves along a route which serves as the first action plan element, or a first contact condition that a movement cost defined in a way that the movement cost becomes higher when a distance from the reference spatial element to the first spatial element is longer is within a prescribed range and the second contact condition; and a third processing section which assumes the second action plan element involving changing the end point trajectory and makes the first processing section recognize the reference spatial element, the first spatial element and the second spatial element on a new discriminant plane including at least a part of the changed end point trajectory and determine whether or not the first spatial element that satisfies the contact condition on the new discriminant plane under the assumption exists, when the second processing section determines that there is a first spatial element that satisfies the contact condition on the discriminant plane, and modifies the route which serves as the first action plan element so as to avoid the reference spatial element from contacting the second spatial element on the discriminant plane including at least a part of the end point trajectory not changed based on the result of the recognition by the first processing section when the second processing section determines that there is still a first spatial element that satisfies the contact condition on the new discriminant plane, and sets the assumed second action plan element as a new second action plan element when the second processing section determines that there is no first spatial element that satisfies the contact condition on the new discriminant plane.

2. The mobile apparatus according to claim 1, wherein said first processing section recognizes said reference spatial element, said first spatial element and said second spatial element on a first discriminant plane, which is said discriminant plane including at least a part of an upper end trajectory of a first part of said mobile apparatus, which serves as the end point trajectory, said second processing section determines whether or not there is said first spatial element that satisfies said contact condition on the first discriminant plane based on the result of the recognition by the first processing section, and said third processing section assumes lowering of the upper end trajectory of the first part as said second action plan element when the second processing section determines that there is the first spatial element that satisfies the contact condition on the first discriminant plane.

3. The mobile apparatus according to claim 2, wherein the mobile apparatus has, as said first part, a head on top of a base body capable of being inclined with respect to the vertical direction, and said third processing section sets, as the second action plan element, lowering of the upper end trajectory of the head by increasing the angle of inclination of the base body with respect to the vertical direction when said second processing section determines that there is said first spatial element that satisfies said contact condition on said first discriminant plane.

4. The mobile apparatus according to claim 2, wherein the mobile apparatus has an arm extending from a base body as said first part, and said third processing section sets, as said second action plan element, lowering of the upper end trajectory of the arm by changing the posture of the arm when said second processing section determines that there is said first spatial element that satisfies said contact condition on said first discriminant plane.

5. The mobile apparatus according to claim 1, wherein said first processing section recognizes said reference spatial element, said first spatial element and said second spatial element on a second discriminant plane, which is said discriminant plane including at least a part of a lower end trajectory of a second part of said mobile apparatus, which serves as the end point trajectory, said second processing section determines whether or not there is said first spatial element that satisfies said contact condition on the second discriminant plane based on the result of the recognition by the first processing section, and said third processing section assumes raising of the lower end trajectory of the second part as the second action plan element when the second processing section determines that there is a first spatial element that satisfies the contact condition on the second discriminant plane.

6. The mobile apparatus according to claim 5, wherein the mobile apparatus has, as said second part, a plurality of legs that extend from a base body and are repeatedly lifted up from and put down on a floor in operation, and said third processing section sets, as said second action plan element, raising of the lower end trajectory of a leg of the plurality of legs that is lifted up from the floor when the second processing section determines that there is a first spatial element that satisfies the contact condition on the second discriminant plane.

7. The mobile apparatus according to claim 5, wherein the mobile apparatus has an arm extending from a base body as said second part, and
said third processing section sets, as the second action plan element, raising of the lower end trajectory of the arm by changing the posture of the arm when said second processing section determines that there is said first spatial element that satisfies said contact condition on said second discriminant plane.

8. The mobile apparatus according to claim 1, wherein said first processing section recognizes said reference spatial element, said first spatial element and said second spatial element on a third discriminant plane, which is a discriminant plane including at least a part of a left or right end trajectory of a third part of said mobile apparatus, which serves as the end point trajectory,
said second processing section determines whether or not there is said first spatial element that satisfies said contact condition on the third discriminant plane based on the result of the recognition by the first processing section, and
said third processing section assumes rightward or leftward shift of the left or right end trajectory of the third part as said second action plan element when the second processing section determines that there is the first spatial element that satisfies the contact condition on the third discriminant plane.

9. The mobile apparatus according to claim 8, wherein the mobile apparatus has an arm extending from a base body as said third part, and
said third processing section sets, as said second action plan element, rightward or leftward shift of the left or right end trajectory of the arm by changing the posture of the arm when said second processing section determines that there is said first spatial element that satisfies said contact condition on said third discriminant plane.

10. The mobile apparatus according to claim 8, wherein the mobile apparatus has, as said third part, a plurality of legs that extend from a base body and are repeatedly lifted up from and put down on a floor, and
said third processing section sets, as said second action plan element, rightward or leftward shift of the left or right end trajectory of the plurality of legs when said second processing section determines that there is said first spatial element that satisfies said contact condition on said third discriminant plane.

11. The mobile apparatus according to claim 1, wherein said first processing section recognizes the behavior of said object by some or all of the position, the velocity and the acceleration of said first spatial element on said discriminant plane and recognizes the first spatial element intermittently or continuously extended according to the result of the recognition so that the first spatial element does not include said reference spatial element as said second spatial element.

12. The mobile apparatus according to claim 11, wherein said first processing section recognizes the behavior of said object by the velocity of said first spatial element and the relative position and the relative velocity of said first spatial element with respect to said reference spatial element on said discriminant plane and recognizes the first spatial element intermittently or continuously extended according to the result of the recognition as said second spatial element.

13. The mobile apparatus according to claim 1, wherein said first processing section recognizes a region determined according to the contour characteristics of said object extended according to the contour characteristics of said mobile apparatus as said first spatial element on said discriminant plane.

14. The mobile apparatus according to claim 13, wherein said first processing section recognizes a Minkowski sum of two regions determined according to the contour characteristics of said mobile apparatus and said object as said first spatial element on the discriminant plane.

15. The mobile apparatus according to claim 1, wherein said second processing section determines whether or not there is the first spatial element that satisfies the contact condition including the first contact condition that said movement cost falls within the prescribed range having a positive lower limit.

16. The mobile apparatus according to claim 1, further includes a camera which photographs a part of the surroundings of the mobile apparatus as a photographing range,
wherein the first processing section recognizes the first spatial element and the second spatial element based on an image obtained by the camera.

17. A control system for controlling the operation of a mobile apparatus by adjusting independently a position and a posture thereof according to a first action plan element defining a position-variation mode and a second action plan element defining a posture-variation mode, respectively, comprising:
a first processing section which recognizes a current image of said mobile apparatus, a current image of an object, and an intermittent or continuous future image of the object, which is determined according to the behavior of the object and has a larger size than the current image thereof, as a reference spatial element, a first spatial element and a second spatial element having a larger size than the first spatial element, respectively, on a discriminant plane including at least a part of an end point trajectory of said mobile apparatus determined based on said second action plan element;
a second processing section which determines, based on the result of the recognition by the first processing section, whether or not there is the first spatial element that satisfies a contact condition which refers to a second contact condition that there exists an intersection point or contact point between the reference spatial element and the first spatial element on the discriminant plane when the reference spatial element moves along a route serving as the first action plan element, or a first contact condition that a movement cost defined in a way that the movement cost becomes higher when a distance from the reference spatial element to the first spatial element is longer is within a prescribed range and the second contact condition; and
a third processing section which assumes the second action plan element involving changing the end point trajectory and makes the first processing section recognize the reference spatial element, the first spatial element and the second spatial element on a new discriminant plane including at least a part of the changed end point trajectory and determine whether or not the first spatial element that satisfies the contact condition on the new discriminant plane under the assumption exists, when the second processing section determines that there is a first spatial element that satisfies the contact condition on the discriminant plane, and modifies the route which serves as the first action plan element so as to avoid the reference spatial element from contacting the second spatial element on the discriminant plane including at least a part of the end point trajectory not changed based on the result of the recognition by the first processing section when the second processing section determines that there is still a first spatial element that satisfies the contact condition on the new discriminant plane, and sets the assumed second action plan element as a new second action plan element when the second processing section determines that there is no first spatial element that satisfies the contact condition on the new discriminant plane.

18. The control system according to claim 17, wherein instructions programmed on a computer make the computer function as said control system.

19. The control system according to claim 18, wherein a supervisory system distributes or broadcasts at least a part of the program to said computer.

* * * * *